United States Patent
Katayama

(10) Patent No.: US 7,622,696 B2
(45) Date of Patent: Nov. 24, 2009

(54) OPTICAL HEAD DEVICE, OPTICAL INFORMATION RECORDING/REPRODUCING APPARATUS AND OPERATION METHOD OF OPTICAL INFORMATION RECORDING/REPRODUCING APPARATUS

(75) Inventor: Ryuichi Katayama, Tokyo (JP)

(73) Assignee: NEC Corporation, Tokyo (JP)

( * ) Notice: Subject to any disclaimer, the term of this patent is extended or adjusted under 35 U.S.C. 154(b) by 266 days.

(21) Appl. No.: 11/885,572

(22) PCT Filed: Mar. 1, 2006

(86) PCT No.: PCT/JP2006/303895
§ 371 (c)(1),
(2), (4) Date: Sep. 4, 2007

(87) PCT Pub. No.: WO2006/093199
PCT Pub. Date: Sep. 8, 2006

(65) Prior Publication Data
US 2009/0121117 A1    May 14, 2009

(30) Foreign Application Priority Data
Mar. 2, 2005   (JP)  ............................. 2005-058036

(51) Int. Cl.
*G01C 21/02*    (2006.01)
(52) U.S. Cl. .................. 250/201.2; 250/201.5
(58) Field of Classification Search .............. 250/201.2, 250/201.5, 201.6, 559.4, 559.27, 559.28; 369/44.23, 44.24, 44.41, 44.42, 112.01, 112.03, 369/112.16, 112.23, 112.24
See application file for complete search history.

(56) References Cited

U.S. PATENT DOCUMENTS 5,195,081 A * 3/1993 Usui ..................... 369/112.23

FOREIGN PATENT DOCUMENTS

JP    62-248151    10/1987

(Continued)

OTHER PUBLICATIONS

Tetsuya Ogata, et al., "Novel Read-out Technology for Multi-layer Disk using Polarization Device", 2006 Optical Data Storage Topical Meeting Conference Proceedings, pp. 31-33.

*Primary Examiner*—Que T Le
*Assistant Examiner*—Don Williams
(74) *Attorney, Agent, or Firm*—Scully, Scott, Murphy & Presser, P.C.

(57) ABSTRACT

An optical head device is provided with an objective lens (5) for collecting light emitted from a light source on an optical recording medium (6); a diffraction optical element (8a) for diffracting the reflection light of the emitted light reflected by the recording medium (6) and enters through the objective lens (5); and a photodetector (10a) for receiving a light flux of the reflection light diffracted by the diffraction optical element (8a). The light flux has a first light flux group passed through an area in the diffraction optical element (8a), and a second light flux group passed through a part of the area. The photodetector (10a) detects the first light flux group and the second light flux group by separate photodetector sections (14a to 14h). Based on the detection results from the separate photodetector sections (14a to 14h), a focus error signal to be used for focus servo and a protection layer thickness shift signal indicating a protection layer thickness shift of the optical recording medium (6) are detected.

22 Claims, 24 Drawing Sheets

| | FOREIGN PATENT DOCUMENTS | |
|---|---|---|
| JP | 05-100114 | 4/1993 |
| JP | 07-318862 | 12/1995 |
| JP | 09-081942 | 3/1997 |
| JP | 09-306054 | 11/1997 |
| JP | 10-83558 A | 3/1998 |
| JP | 10-124906 | 5/1998 |
| JP | 11-073658 | 3/1999 |
| JP | 11-219529 | 8/1999 |
| JP | 11-242824 A | 9/1999 |
| JP | 2000-76688 | 3/2000 |
| JP | 2000-155973 | 6/2000 |
| JP | 2000-155979 | 6/2000 |
| JP | 2000-182254 | 6/2000 |
| JP | 2001-110074 | 4/2001 |
| JP | 2001-126304 | 5/2001 |
| JP | 2001-155375 | 6/2001 |
| JP | 2001-236666 | 8/2001 |
| JP | 2002-74728 A | 3/2002 |
| JP | 2002-092933 | 3/2002 |
| JP | 2002-237085 | 8/2002 |
| JP | 2002-245639 | 8/2002 |
| JP | 2002-279683 | 9/2002 |
| JP | 2002-358677 | 12/2002 |
| JP | 2002-367197 | 12/2002 |
| JP | 2003-016672 | 1/2003 |
| JP | 2003-45047 | 2/2003 |
| JP | 2003-51130 | 2/2003 |
| JP | 2003-91856 | 3/2003 |
| JP | 2003-132582 | 5/2003 |
| JP | 2003-248118 | 9/2003 |
| JP | 2003-346365 | 12/2003 |
| JP | 2004-039018 | 2/2004 |
| JP | 2004-069977 | 3/2004 |
| JP | 2004-070977 | 3/2004 |
| JP | 2004-163225 | 6/2004 |
| JP | 2005-044429 | 2/2005 |
| JP | 2005-063595 | 3/2005 |
| JP | 2005-203090 | 7/2005 |
| JP | 2005-276358 | 10/2005 |
| JP | 2005-317106 | 11/2005 |
| JP | 2005-353187 | 12/2005 |
| JP | 2006-196156 | 7/2006 |
| JP | 2006-236578 A | 9/2006 |
| JP | 2006-244535 | 9/2006 |
| JP | 2006-252716 A | 9/2006 |
| JP | 2006-323926 A | 11/2006 |
| JP | 2007-18603 A | 1/2007 |
| JP | 2007-257750 | 10/2007 |
| JP | 2008-021339 | 1/2008 |
| WO | WO 2004/008196 A1 | 1/2004 |
| WO | WO 2007/043663 A1 | 4/2007 |

* cited by examiner

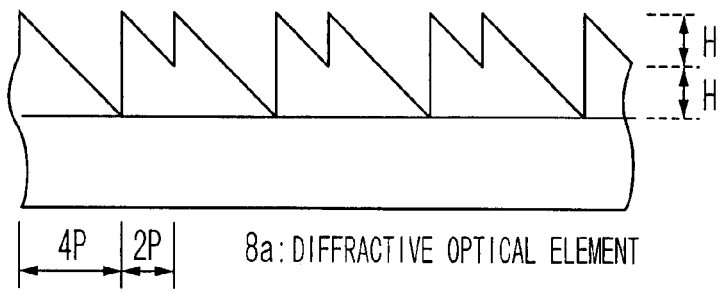
Fig. 8A
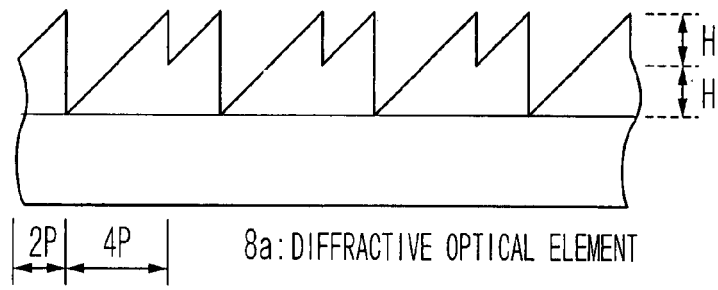
Fig. 8B
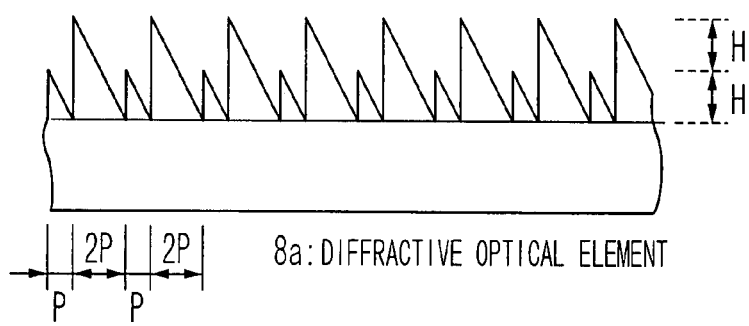
Fig. 8C
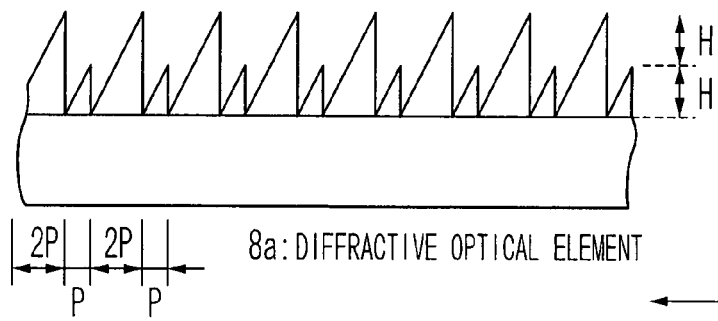
Fig. 8D
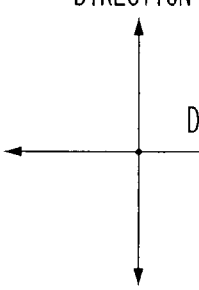

Fig. 14A
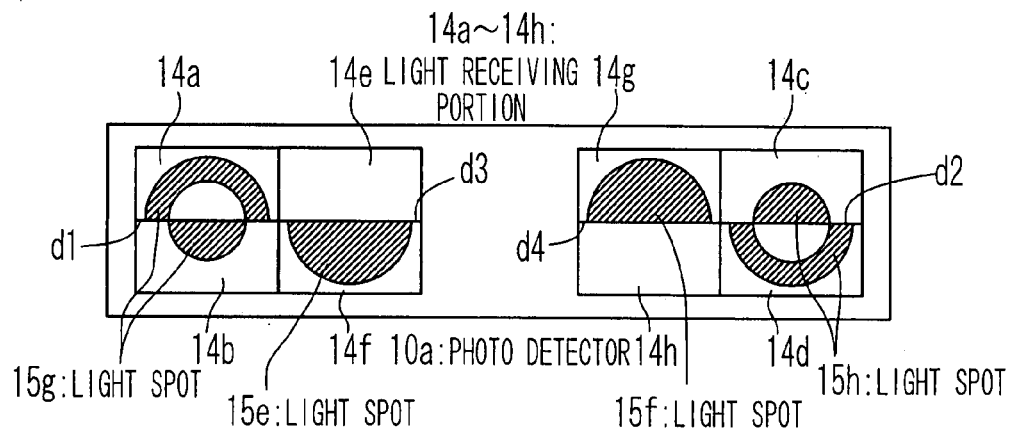
Fig. 14B
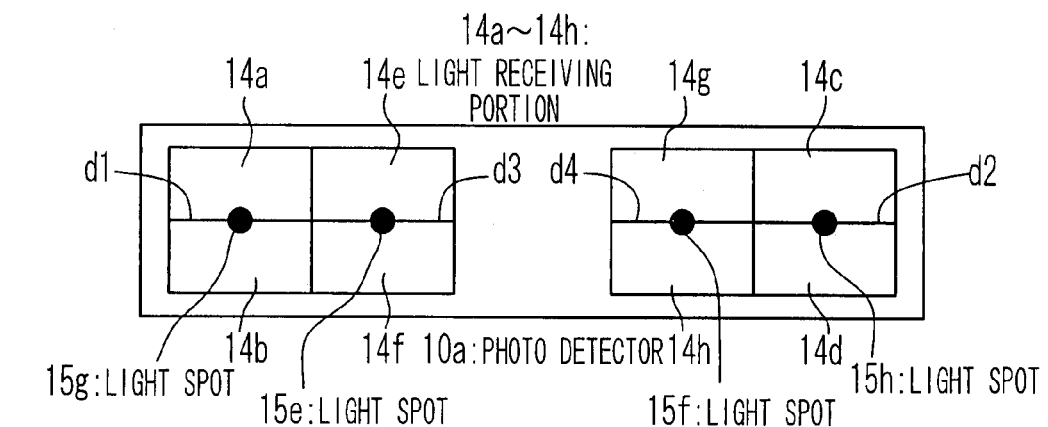
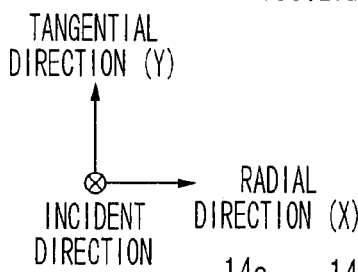
Fig. 14C
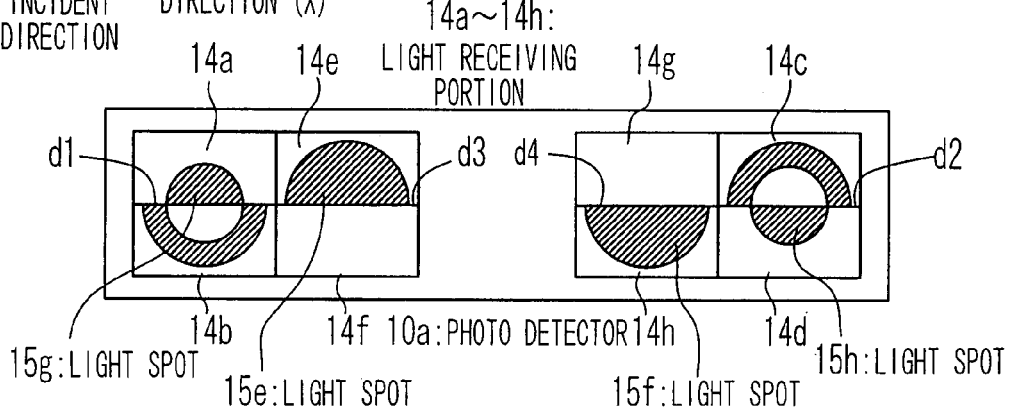

OPTICAL HEAD DEVICE, OPTICAL INFORMATION RECORDING/REPRODUCING APPARATUS AND OPERATION METHOD OF OPTICAL INFORMATION RECORDING/REPRODUCING APPARATUS

TECHNICAL FIELD

The present invention relates to an optical head device and an optical information recording/reproducing apparatus which are used record to or reproduce from an optical recording medium.

BACKGROUND ART

A recording density in an optical information recording/reproducing apparatus is inversely proportional to the square of diameter of a light spot formed on an optical recording medium by an optical head device. In other words, as the diameter of the light spot is smaller, the recording density is higher. The diameter of the light spot is inversely proportional to the numerical aperture of an objective lens of the optical head device. In other words, as the numerical aperture of the objective lens is higher, the diameter of the light spot is smaller. On the other hand, when the thickness of protective layer of the optical recording medium is deviated from a designed value (hereafter, such deviation is referred to as a protective-layer-thickness deviation), the spherical aberration caused by the protective-layer-thickness deviation distorts the shape of the light spot and deteriorates a record/reproduction characteristic. The spherical aberration is proportional to the fourth power of the numerical aperture of the objective lens. Thus, as the numerical aperture of the objective lens is higher, the safety margin of the protective-layer-thickness deviation of the optical recording medium for the record/reproduction characteristic is narrower. Hence, as for the optical head device and the optical information recording/reproducing apparatus in which the numerical aperture of the objective lens is increased in order to increase the recording density, the protective-layer-thickness deviation of the optical recording medium is required to be detected and compensated to prevent the deterioration of the record/reproduction characteristic.

As art for detecting and compensating the protective-layer-thickness deviation of the optical recording medium, Japanese Laid Open Patent Application (JP-P 2002-367197A) discloses optical head devices and an optical information recording/reproducing apparatus. Japanese Laid Open Patent Application (JP-P 2002-367197A) discloses two optical head devices. FIG. 1 is a schematic diagram showing a configuration of a first optical head device. With reference to FIG. 1, an emitted light from a semiconductor laser 101 is made parallel by a collimator lens 102, and about 50% thereof is transmitted through a beam splitter 123 and is condensed onto a disk 106 by an objective lens 105. The reflection light from the disk 106 is transmitted through the objective lens 105 in the opposite direction, and about 50% of the transmitted light is reflected by the beam splitter 123 and diffracted by a diffractive optical element 108d and received through a lens 109 and a cylindrical lens 124 by a photo detector 110c.

FIG. 2 is a plan view of the diffractive optical element 108d from the incident direction of the light in the first optical head device. The diffractive optical element 108d includes diffractive gratings formed in a region 113i inside and a region 113j outside a circle. The diameter of the circle is smaller than the effective diameter (objective-lens-effective-diameter-inside region 160) of the objective lens 105 indicated by a dotted line in the figure. In the diffractive grating formed in the region 113i, the grating direction is parallel to the radial direction of the disk 106, and the grating pattern is straight lines of a constant interval. In the diffractive grating formed in the region 113j, the grating direction is parallel to the tangential direction of the disk 106, and the grating pattern is straight lines of a constant interval. About 40.5% of the incident light to each of the regions 113i and 113j is diffracted as ±1st order diffracted lights.

FIG. 3 shows a pattern of light receiving portions of the photo detector 110c, an arrangement of light spots on the photo detector 110c, and a configuration of a calculating circuit connected to the light receiving portions of the photo detector 110c in the first optical head device. Each of light receiving portions 114u and 114v is separated in four by two separation lines parallel to the radial direction and to the tangential direction of the disk 106. The two separation lines extend through the optical axis. The −1st order diffracted light from the region 113i of the diffractive optical element 108d is received by the light receiving portion 114v. The +1st order diffracted light from the region 113j of the diffractive optical element 108d is received by the light receiving portion 114u.

The outputs from the light receiving portion 114v are connected to a differential amplifier 116b. The differential amplifier 116b calculates the difference between two outputs and two outputs to obtain a focus error signal for the inner portion of the light beam through an astigmatism method. The outputs from the light receiving portion 114u are inputted to a differential amplifier 116a. The differential amplifier 116a calculates the difference between two outputs and two outputs to obtain a focus error signal for the outer portion of the light beam through the astigmatism method. The outputs from the differential amplifier 116b and the differential amplifier 116a are inputted to an adder 125. The adder 125 calculates the sum of them to obtain a signal 117g. The signal 117g is the sum of the focus error signal for the inner portion of the light beam and the focus error signal for the outer portion of the light beam, and is used as a focus error signal that is used for a focus servo in order to compensate a focus deviation. The outputs from the differential amplifier 116b and the differential amplifier 116a are inputted to a subtracter 126. The subtracter 126 calculates the difference between them to obtain a signal 117h. The signal 117h is the difference between the focus error signal for the inner portion of the light beam and the focus error signal for the outer portion of the light beam, and is used as a protective-layer-thickness-deviation signal indicating the protective-layer-thickness deviation of the disk 106.

A second optical head device corresponds to the first optical head device in which the diffractive optical element 108d and the photo detector 110c are replaced with a diffractive optical element 108e and a photo detector 110d, respectively, and in which the cylindrical lens 124 is eliminated.

FIG. 4 is a plan view of the diffractive optical element 108e from the incident direction of the light in the second optical head device. The diffractive optical element 108e includes diffractive gratings formed inside and outside a circle having the diameter smaller than the effective diameter (objective-lens-effective-diameter-inside region 160) of the objective lens 105 indicated by a dotted line in the figure. The diffractive grating of inside is separated into two regions 113k and 131 by a straight line parallel to the radial direction of the disk 106. The straight line extends through the optical axis. The diffractive grating of outside is separated into two regions 113m and 113n by the straight line parallel to the radial direction of the disk 106. The straight line extends through the optical axis. In each region 113k, 113m, the angle of grating direction is positive with respect to the radial direction of the disk 106 and the grating pattern is straight lines of a constant interval. The radial direction extends through the optical axis. In each region 113l, 113n, the angle of grating direction is negative with respect to the radial direction of the disk 106 and the grating pattern is straight lines of a constant interval. The radial direction extends through the optical axis. About 40.5% of the incident light to each of the regions 113k, 113l, 113m and 113n is diffracted as ±1st order diffracted lights.

FIG. 5 shows a pattern of light receiving portions of the photo detector 110d, an arrangement of light spots on the photo detector 110d, and a configuration of a calculating circuit connected to the light receiving portions of the photo detector 110d in the second optical head device. Each of light receiving portions 114w and 114x is separated in four by two separation lines parallel to the radial direction and to the tangential direction of the disk 106. Each of light receiving portions 114y and 114z is separated by a separation line parallel to the radial direction of the disk 106. In the diffractive optical element 108e, the +1st order diffracted light from the region 113k and the +1st order diffracted light from the region 113m are received by the left side and the right side of the light receiving portion 114w, respectively, and the +1st order diffracted light from the region 113l and the +1st order diffracted light from the region 113n are received by the left side and the right side of the light receiving portion 114x, respectively. In the diffractive optical element 108e, the −1st order diffracted light from the region 113k and the −1st order diffracted light from the region 113m are received by the right side and the left side of the light receiving portion 114z, respectively, and the −1st order diffracted light from the region 113l and the −1st order diffracted light from the region 113n are received by the right side and the left side of the light receiving portion 114y, respectively.

The outputs from the light receiving portions 114y, 114z are inputted to the differential amplifier 116b. The differential amplifier 116b calculates the difference between two outputs and two outputs to obtain a signal 117j. The signal 117j is the sum of a focus error signal for the inner portion of the light beam and a focus error signal for the outer portion of the light beam, and is used as the focus error signal that is used for the focus servo. The focus error signals for the inner and outer portions are based on a knife edge method. The outputs from the light receiving portions 114w and 114x are inputted to the differential amplifier 116a. The differential amplifier 116a calculates the difference between four outputs and four outputs to obtain a signal 117i. The signal 117i is the difference between the focus error signal for the inner portion of the light beam and the focus error signal for the outer portion of the light beam, and is used as the protective-layer-thickness-deviation signal indicating the protective-layer-thickness deviation of the disk 106. The focus error signals for the inner and outer portions are based on the knife edge method.

As art for detecting protective-layer-thickness deviation in an optical recording medium, Japanese Laid Open Patent Application (JP-P 2000-155979A) discloses an optical head device and an optical information recording/reproducing apparatus. In the optical head device, a diffractive optical element separates the reflection light from the optical recording medium into the light of a ring band region and the light of the other region, and the former and the latter are received by different light receiving portions of a photo detector. The optical axis serves as a center of the ring band region. A focus error signal used for a focus servo is obtained from the output of the light receiving portion for receiving the latter light, and a protective-layer-thickness-deviation signal is obtained from the output of the light receiving portion for receiving the former light.

As art for detecting protective-layer-thickness deviation of an optical recording medium, Japanese Laid Open Patent Application (JP-P 2003-132582A) discloses an optical head device and an optical information recording/reproducing apparatus. In the optical head device, the reflection light from the optical recording medium is separated into two by a diffractive optical element or a beam splitter, a photo detector receives one by a light receiving portion arranged at the focal point and the other by a light receiving portion arranged at the position away from the focal point along the optical axis direction. Consequently, a focus error signal used for a focus servo is obtained from the output of the light receiving portion for receiving one light, and a protective-layer-thickness-deviation signal is obtained from the output of the light receiving portion for receiving the other light.

In the first optical head device and the optical information recording/reproducing apparatus of Japanese Laid Open Patent Application (JP-P 2002-367197A), the sum of the focus error signal for the inner portion of the light beam and the focus error signal for the outer portion of the light beam is used as the focus error signal used for the focus servo, and the difference between the focus error signal for the inner portion of the light beam and the focus error signal for the outer portion of the light beam is used as the protective-layer-thickness-deviation signal. Thus, in addition to the two differential amplifiers for obtaining the focus error signal for the inner portion of the light beam and the focus error signal for the outer portion of the light beam, the adder for obtaining the focus error signal used for the focus servo and the subtracter for obtaining the protective-layer-thickness-deviation signal are required, resulting in a complicated configuration of the electric circuit.

In the second optical head device and the optical information recording/reproducing apparatus of Japanese Laid Open Patent Application (JP-P 2002-367197A), in order to obtain the focus error signal used for the focus servo, the inner portion of the light beam and the outer portion of the light beam, which are separated by the diffractive optical element, are received by the same light receiving portion, and the size of the light receiving portion is large. Moreover, when the record or reproduction is performed on the optical recording medium of multilayer type, the reflection light from a layer other than a layer on which the record or reproduction is performed incidents on the light receiving portion as stray light. Thus, the record/reproduction characteristic is deteriorated. In this case, the light receiving portion of large size increases the amount of stray light which incidents on the light receiving portion and the record/reproduction characteristic is largely deteriorates.

In the optical head device and the optical information recording/reproducing apparatus of Japanese Laid Open Patent Application (JP-P 2000-155979A), in order to obtain the focus error signal used for the focus servo, only the light that includes the partial region of the reflection light from the optical recording medium is used. However, when the protective-layer-thickness deviation exists in the optical recording medium, the focus error signal obtained by using only the light that includes the partial region of the reflection light from the optical recording medium disagrees with the focus error signal obtained by using the light that includes the entire region of the reflection light from the optical recording medium in zero cross point, and does not indicate the correct focus deviation.

In the optical head device and the optical information recording/reproducing apparatus of Japanese Laid Open Patent Application (JP-P 2003-132582A), the protective-layer-thickness-deviation signal is obtained based on the phenomena that the protective-layer-thickness deviation of the optical recording medium causes an asymmetrical change in the focus error signal with respect to the direction of the focus deviation. However, since the asymmetrical change in the focus error signal caused by the protective-layer-thickness deviation of the optical recording medium is extremely small, it is difficult to obtain the protective-layer-thickness-deviation signal of high sensitivity by using the asymmetrical change.

As related art, Japanese Laid Open Patent Application (JP-P 2002-245639A) discloses an optical disk apparatus. The optical disk apparatus records information on and reproduces information from an optical disk in which a recording layer is formed above a transparent substrate. The optical disk apparatus condenses a light for record or reproduction of information through the transparent substrate of the optical disk on the recording layer. The optical disk apparatus includes: a signal detecting means for detecting a focus error signal and a focus sum signal from the return light reflected by the recording layer; and a thickness error detecting means for detecting a thickness error in the transparent substrate with respect to a specified value based on the property of the focus error signal.

Japanese Laid Open Patent Application (JP-P 2003-45047A) discloses an optical pickup apparatus. The optical pickup apparatus includes: an emitting optical system for condensing a light beam through an optically transparent layer of an optical recording medium onto a recording surface to form a spot; and a light detecting optical system for condensing the return light reflected from the spot onto a photo detector, and detects a focal point error of the light beam. The optical pickup apparatus includes a diffractive optical element which is arranged on the optical axis of the return light in the light detecting optical system and includes a ring band. The ring band extracts a circular ray component around a predetermined radius on a pupil from the return light. The predetermined radius corresponds to a maximum value in the wave surface aberration distribution on an exit pupil of the emitting optical system. The photo detector includes a spot light receiving portion for receiving the extracted ray component which is transmitted through the ring band, and a focal point error detecting circuit which is connected to the spot light receiving portion and detects the focal point error of the light beam based on a photoelectric conversion output from the spot light receiving portion.

Japanese Laid Open Patent Application (JP-P 2003-91856A) discloses an optical pickup. The optical pickup includes: a first light source and a second light source which emit light beams of different wave lengths, respectively; a means for synthesizing optical paths of the light beams emitted from the first light source and the second light source along the substantially same axes; a converging means for condensing the light beams on a signal recording surface of a recording medium; and a light receiving element for receiving the return lights as the light beams reflected by the signal recording surface of the recording medium. An optical element, which makes the return lights corresponding to the light beams emitted from the first light source and the second light source to incident onto the substantially same positions on the light receiving element, is arranged between the converging means and the light receiving element.

DISCLOSURE OF INVENTION

An object of the present invention is to provide an optical head device and an optical information recording/reproducing apparatus, which can detect a protective-layer deviation in an optical recording medium at high sensitivity.

Another object of the present invention is to provide an optical head device and an optical information recording/reproducing apparatus, which can detect at least one of a focus deviation and a protective-layer-thickness deviation by using a simple circuit configuration.

Still another object of the present invention is to provide an optical head device and an optical information recording/reproducing apparatus in which the deterioration of a record/reproduction characteristic is small for an optical recording medium of multilayer type.

Still another object of the present invention is to provide an optical head device and an optical information recording/reproducing apparatus, which are simple in configuration.

In order to solve the above problem, an optical head device of the present invention includes: an objective lens configured to condense an emitted light from a light source onto an optical recording medium; a diffractive optical element configured to separate a reflection light into a plurality of light beams; and a photo detector configured to receive the plurality of light beams separated by the diffractive optical element. The emitted light is reflected by the optical recording medium and incidents as the reflection light through the objective lens into the diffractive optical element. The plurality of light beams includes a first light beam group which is generated from an entire region in a section of the reflection light and a second light beam group which is generated from at least a partial region in the section of the reflection light. The photo detector is configured to receive the first light beam group and the second light beam group by different light receiving portions for detecting a focus error signal used for a focus servo and a protective-layer-thickness-deviation signal indicating a protective-layer-thickness deviation of the optical recording medium.

As for the optical head device, the diffractive optical element includes, in a section perpendicular to an optical axis of an incident light which incidents into the diffractive optical element, a first region and a second region. A distance between the first region and the optical axis is within a first range. A distance between the second region and the optical axis is within a second range. The first light beam group is generated from an incident light to the first region and the second region. The second light beam group is generated from an incident light to the first region.

As for the optical head device, the first region is a region inside a circle in the section of the diffractive optical element. The section is perpendicular to the optical axis of the incident light. The optical axis of the incident light serves as a center of the circle. The second region is a region outside the circle in the section.

As for the optical head device, the first region is a ring band region in the section of the diffractive optical element. The section is perpendicular to the optical axis of the incident light. The optical axis of the incident light serves as a center of the ring band region. The second region is a region other than the first region in the section.

As for the optical head device, the first region includes a first upper region and a first lower region in the section of the diffractive optical element. The section is perpendicular to the optical axis of the incident light. The first upper region and the first lower region are separated by a straight line extending through the optical axis of the incident light. The second region includes a second upper region and a second lower region in the section of the diffractive optical element. The section is perpendicular to the optical axis of the incident light. The second upper region and the second lower region are separated by the straight line. The first light beam group includes: a light beam generated from an incident light to the first upper region and the second upper region; and a light beam generated from an incident light to the first lower region and the second lower region. The second light beam group includes: a light beam generated from an incident light to the first upper region; and a light beam generated from an incident light to the first lower region.

As for the optical head device, the diffractive optical element includes, in its section perpendicular to an optical axis of an incident light which incidents into the diffractive optical element, a first region and a second region. A distance between the first region and the optical axis is within a first range. A distance between the second region and the optical axis is within a second range. The first region includes a first upper region and a first lower region in the section of the diffractive optical element. The section is perpendicular to the optical axis of the incident light. The first upper region and the first lower region are separated by a straight line extending through the optical axis of the incident light. The second region includes a second upper region and a second lower region in the section of the diffractive optical element. The section is perpendicular to the optical axis of the incident light. The second upper region and the second lower region are separated by the straight line. The first light beam group includes: a light beam generated from an incident light to the first upper region and the second upper region; and a light beam generated from an incident light to the first lower region and the second lower region. The second light beam group includes: a light beam generated from an incident light to the first upper region and the second lower region; and a light beam generated from an incident light to the first lower region and the second upper region.

As for the optical head device, the first light beam group is a −2nd order diffracted light from the first upper region, a +2nd order diffracted light from the first lower region, a −2nd order diffracted light from the second upper region and a +2nd order diffracted light from the second lower region. The second light beam group is a −1st order diffracted light from the first upper region and a +1st order diffracted light from the first lower region.

As for the optical head device, the first light beam group is ±1st order diffracted lights from the first region and ±1st order diffracted lights from the second region. The second light beam group is ±2nd order diffracted lights from the first region.

As for the optical head device, the first light beam group is a 0th order light from the first region and a 0th order light from the second region. The second light beam group is a 1st order diffracted light from the first region.

As for the optical head device, the first light beam group is a −1st order diffracted light from the first upper region, a +1st order diffracted light from the first lower region, a −1st order diffracted light from the second upper region and a +1st order diffracted light from the second lower region. The second light beam group is a −2nd order diffracted light from the first upper region, a +2nd order diffracted light from the first lower region, a +2nd order diffracted light from the second upper region and a −2nd order diffracted light from the second lower region.

In order to solve the above problem, an optical information recording/reproducing apparatus of the present invention includes: the optical head device which is described in any one of the above paragraphs; and a calculating circuit configured to detect the focus error signal used for the focus servo and the protective-layer-thickness-deviation signal based on output signals from the light receiving portions of the optical head device. The optical head device is configured to emit the emitted light onto the optical recording medium and to receive the reflection light, As for the optical information recording/reproducing apparatus, the calculating circuit includes a first differential amplifying circuit to which the output signal outputted from the light receiving portion for receiving the first light beam group is inputted. The first differential amplifying circuit is configured to generates the focus error signal used for the focus servo based on a first output signal which is outputted from the light receiving portion and corresponds to the first light beam group.

As for the optical information recording/reproducing apparatus, the calculating circuit further includes a second differential amplifying circuit to which an output signal outputted from a light receiving portion for receiving the second light beam group is inputted. The second differential amplifying circuit is configured to generate a third output signal based on a second output signal which is outputted from the light receiving portion and corresponds to the second light beam group. The calculating circuit is configured to detect the third output signal as the protective-layer-thickness-deviation signal.

As for the optical information recording/reproducing apparatus, the calculating circuit further includes a second differential amplifying circuit to which an output signal outputted from a light receiving portion for receiving the second light beam group is inputted. The second differential amplifying circuit is configured to generate a third output signal based on a second output signal which is outputted from the light receiving portion and corresponds to the second light beam group. The calculating circuit is configured to detect a signal obtained by subtracting the focus error signal from the third output signal as the protective-layer-thickness-deviation signal.

The optical information recording/reproducing apparatus further includes: a compensating section configured to compensate a protective-layer-thickness deviation of the optical recording medium; and a driving circuit configured to output a drive signal for driving the compensating section to compensate the protective-layer-thickness deviation of the optical recording medium based on the protective-layer-thickness-deviation signal of the optical recording medium.

As for the optical information recording/reproducing apparatus, the compensating section is two relay lenses installed between the light source and the objective lens. The driving circuit is configured to make one of the two relay lenses to move along an optical axis direction through the drive signal to compensate the protective-layer-thickness deviation of the optical recording medium.

As for the optical information recording/reproducing apparatus, the compensating section is a collimator lens installed between the light source and the objective lens. The driving circuit is configured to make the collimator lens to move along an optical axis direction through the drive signal to compensate the protective-layer-thickness deviation of the optical recording medium.

As for the optical information recording/reproducing apparatus, the compensating section is a liquid crystal optical element installed between the light source and the objective lens. The driving circuit is configured to apply a voltage to the liquid crystal optical element through the drive signal to compensate the protective-layer-thickness deviation of the optical recording medium.

In order to solve the above problem, an operating method of optical information recording/reproducing apparatus of the present invention includes: a providing step for providing an optical information recording/reproducing apparatus which includes an optical head device, a calculating circuit, a compensating section and a driving circuit, wherein the optical head device includes a light source, an objective lens, a diffractive optical element and a photo detector; a light condensing step in which the objective lens condenses an emitted light from the light source onto an optical recording medium; a separating step in which the diffractive optical element separates a reflection light into a plurality of light beams, wherein the emitted light is reflected by the optical recording medium and incidents as the reflection light through the objective lens into the diffractive optical element; a light receiving step in which different light receiving portions of the photo detector receives a first light beam group and a second beam group which are separated by the diffractive optical element, wherein the first light beam group is generated from an entire region in a section of the reflection light and the second light beam group is generated from at least a partial region in the section of the reflection light; a detecting step in which the calculating circuit detects a focus error signal used for a focus servo and a protective-layer-thickness-deviation signal based on output signals from the different light receiving portions; an outputting step in which the driving circuit outputs a drive signal for driving the compensating section to compensate a protective-layer-thickness deviation of the optical recording medium based on the protective-layer-thickness-deviation signal; and a compensating step in which the compensating section compensates the protective-layer-thickness deviation of the optical recording medium based on the drive signal.

As for the operating method of optical information recording/reproducing apparatus, the compensating section is two relay lenses installed between the light source and the objective lens. The compensating step is a step in which the driving circuit makes one of the two relay lenses to move along an optical axis direction through the drive signal to compensate the protective-layer-thickness deviation of the optical recording medium.

As for the operating method of optical information recording/reproducing apparatus, the compensating section is a collimator lens installed between the light source and the objective lens. The compensating step is a step in which the driving circuit makes the collimator lens to move along an optical axis direction through the drive signal to compensate the protective-layer-thickness deviation of the optical recording medium.

As for the operating method of optical information recording/reproducing apparatus, the compensating section is a liquid crystal optical element installed between the light source and the objective lens. The compensating step is a step in which the driving circuit applies a voltage to the liquid crystal optical element through the drive signal to compensate the protective-layer-thickness deviation of the optical recording medium.

BRIEF DESCRIPTION OF DRAWINGS

FIG. 8A is a sectional view of the diffractive optical element in the first embodiment of the optical head device according to the present invention;

FIG. 8B is a sectional view of the diffractive optical element in the first embodiment of the optical head device according to the present invention;

FIG. 8C is a sectional view of the diffractive optical element in the first embodiment of the optical head device according to the present invention;

FIG. 8D is a sectional view of the diffractive optical element in the first embodiment of the optical head device according to the present invention;

FIG. 14A shows a pattern of light receiving portions of a photo detector and an arrangement of light spots on the photo detector in the second embodiment of the optical head device according to the present invention;

FIG. 14B shows a pattern of light receiving portions of a photo detector and an arrangement of light spots on the photo detector in the second embodiment of the optical head device according to the present invention;

FIG. 14C shows a pattern of light receiving portions of a photo detector and an arrangement of light spots on the photo detector in the second embodiment of the optical head device according to the present invention;

BEST MODE FOR CARRYING OUT THE INVENTION

Embodiments of an optical head device and an optical information recording/reproducing apparatuses according to the present invention will be described below with reference to the attached drawings.

First Embodiment of Optical Head Device

Figure 1:
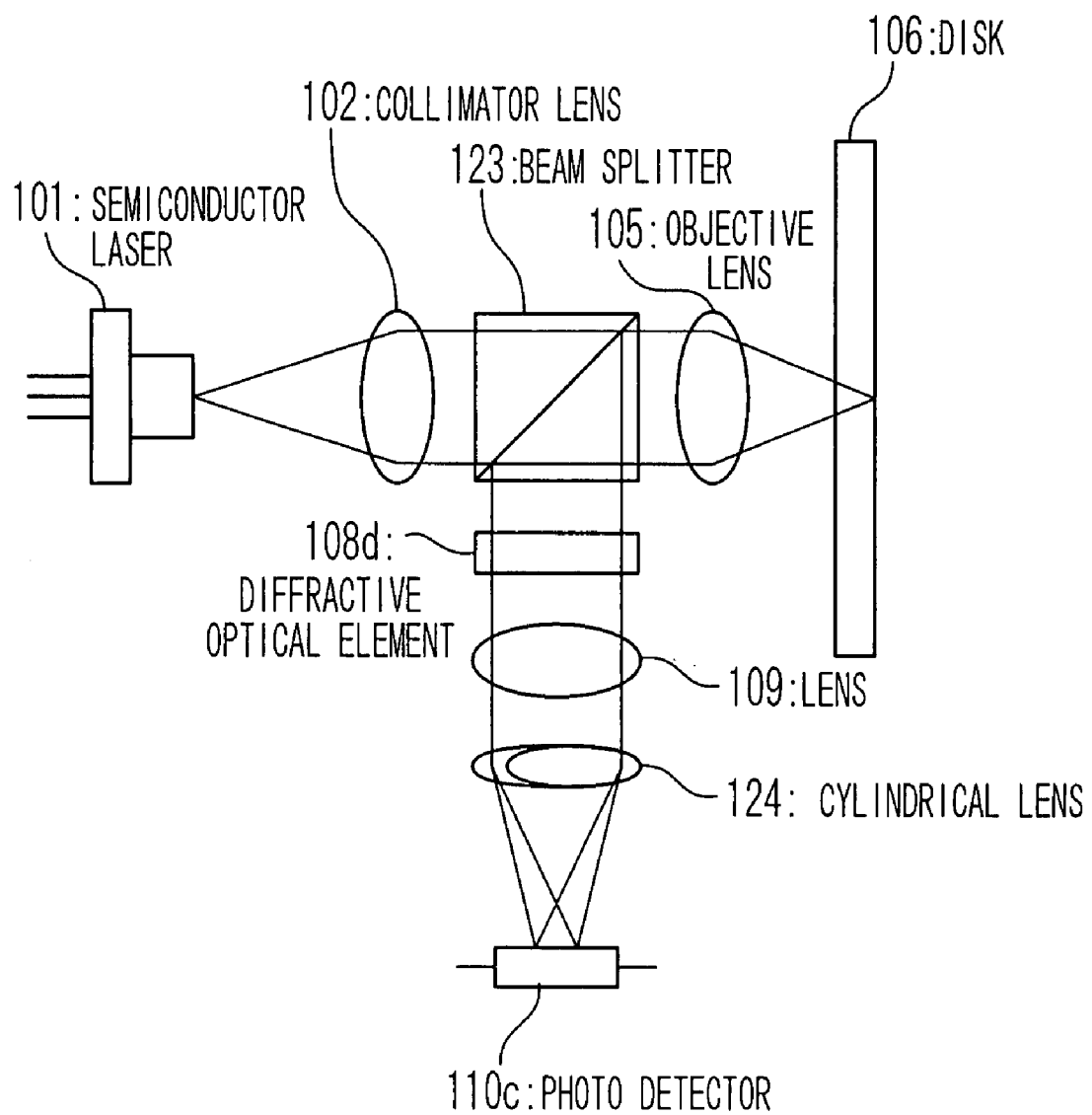
FIG. 1 is a schematic diagram showing a configuration of an optical head device according to conventional art.
Figure 2:
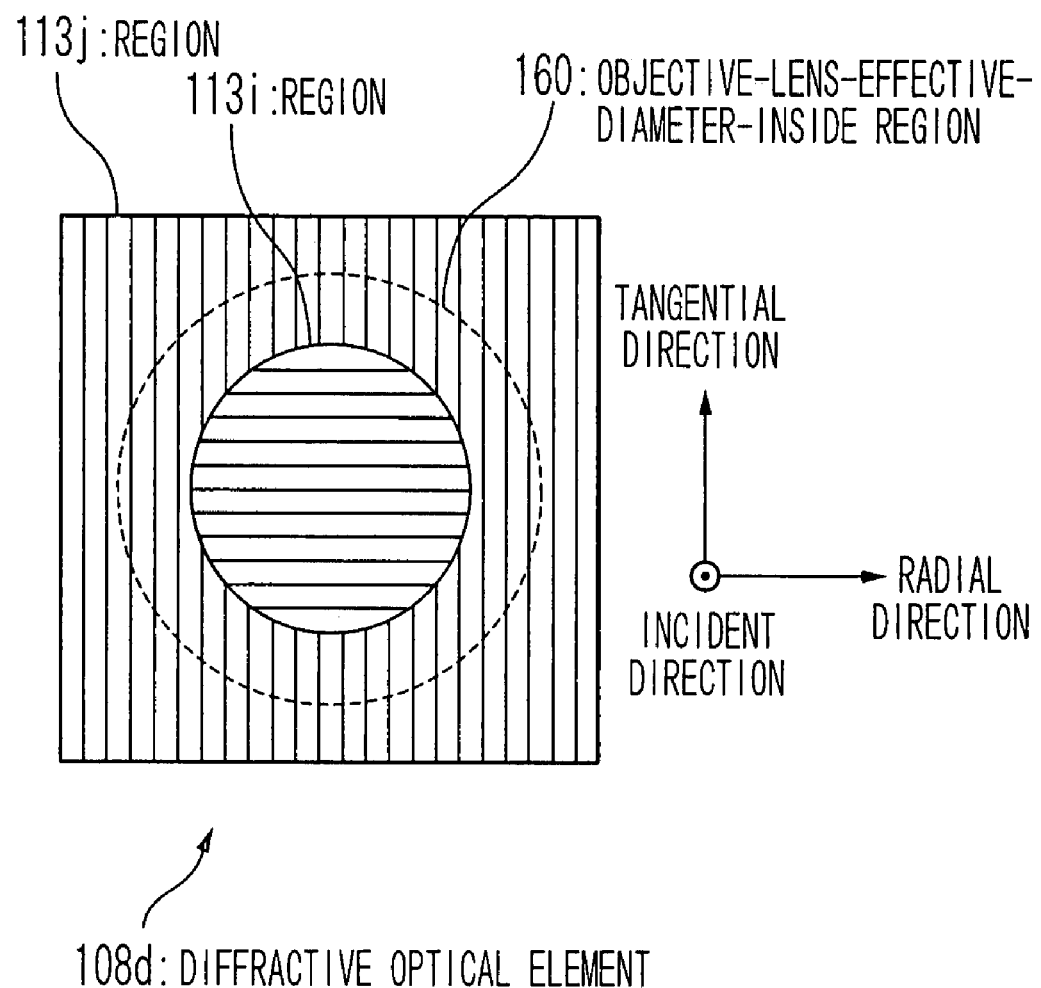
FIG. 2 is a plan view of a diffractive optical element of the optical head device according to the conventional art.
Figure 3:
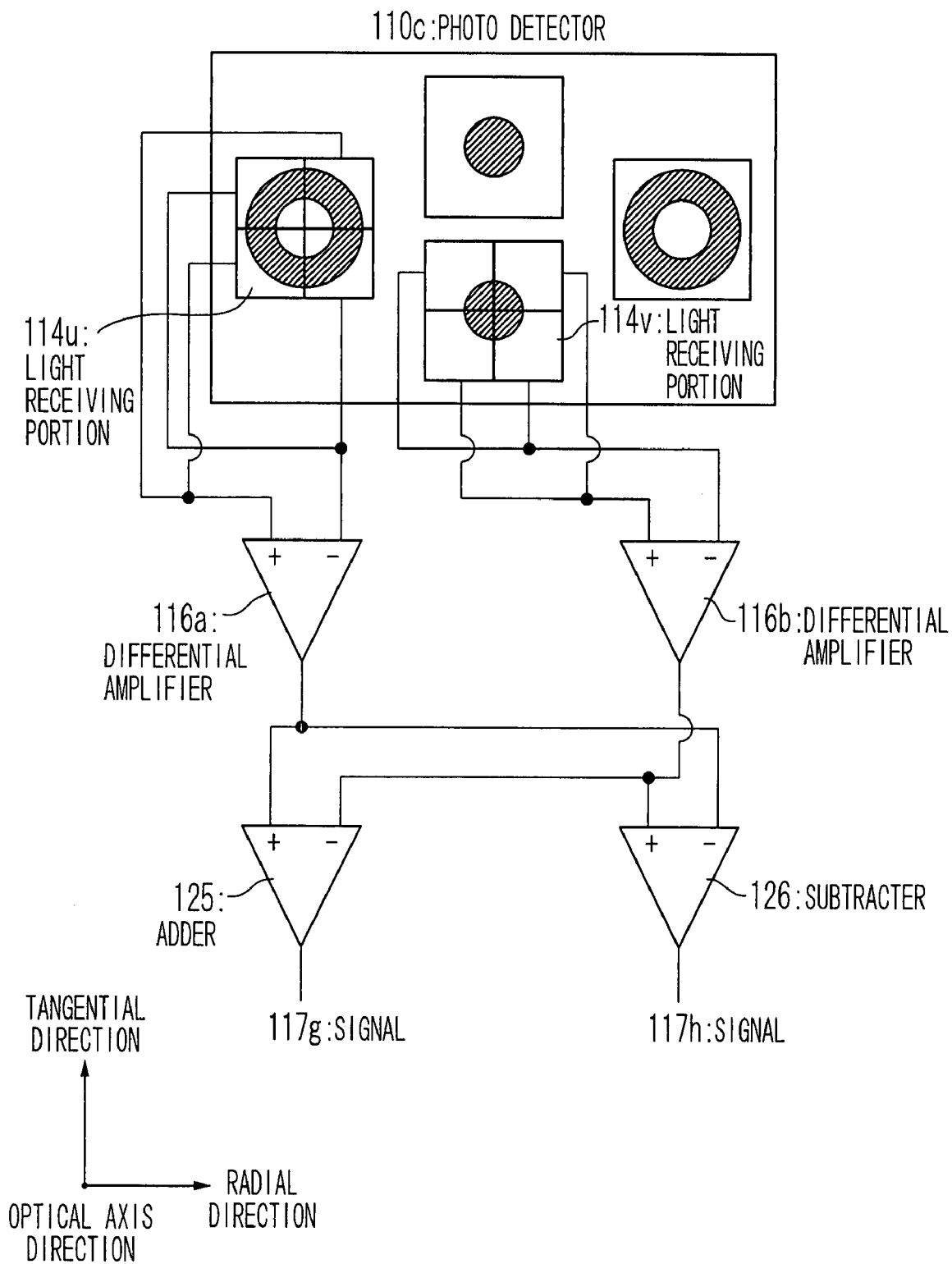
FIG. 3 is a schematic diagram showing a pattern of light receiving portions of a photo detector, an arrangement of light spots on the photo detector, and a configuration of a calculating circuit connected to the light receiving portions of the photo detector in the optical head device according to the conventional art.
Figure 4:
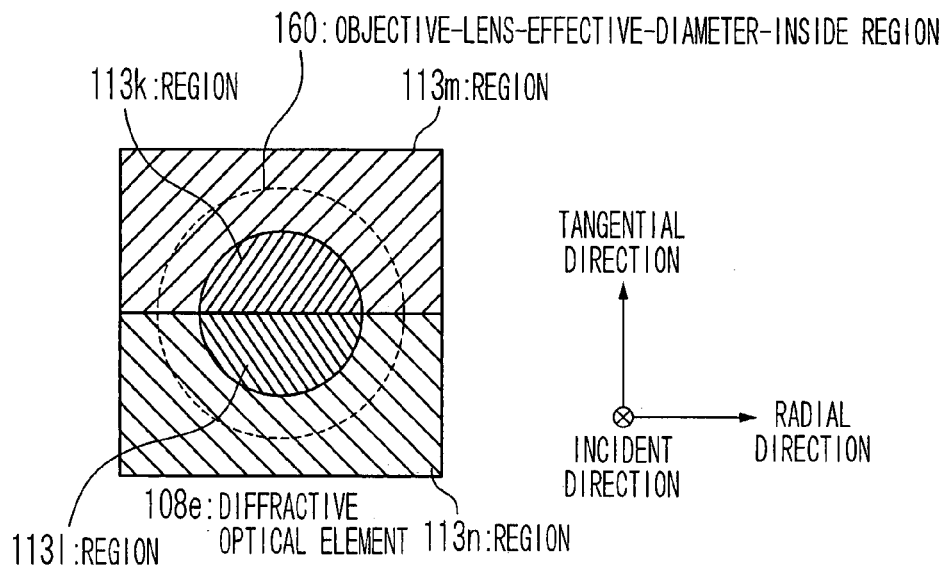
FIG. 4 is a plan view of a diffractive optical element of an optical head device according to the conventional art.
Figure 5:
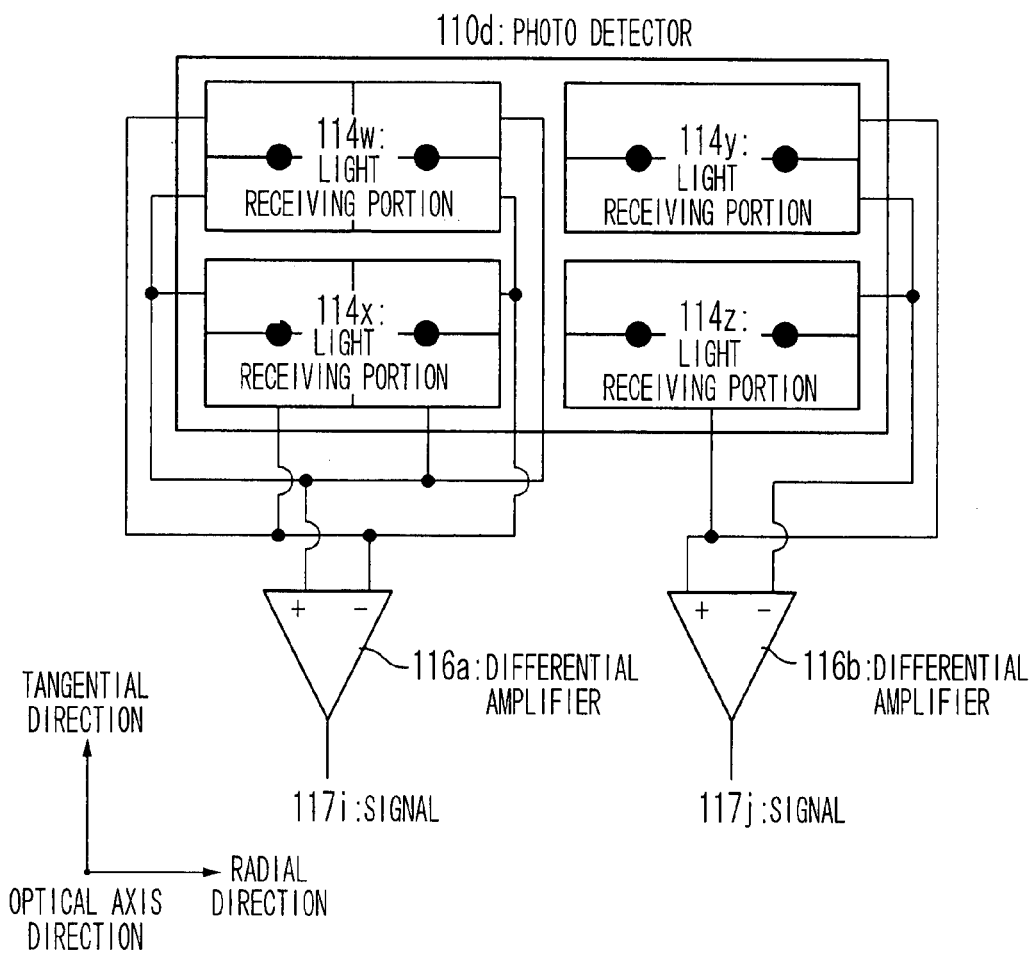
FIG. 5 is a schematic diagram showing a pattern of light receiving portions of a photo detector, an arrangement of light spots on the photo detector, and a configuration of a calculating circuit for outputs from the light receiving portions of the photo detector in the optical head device according to the conventional art.
Figure 6:
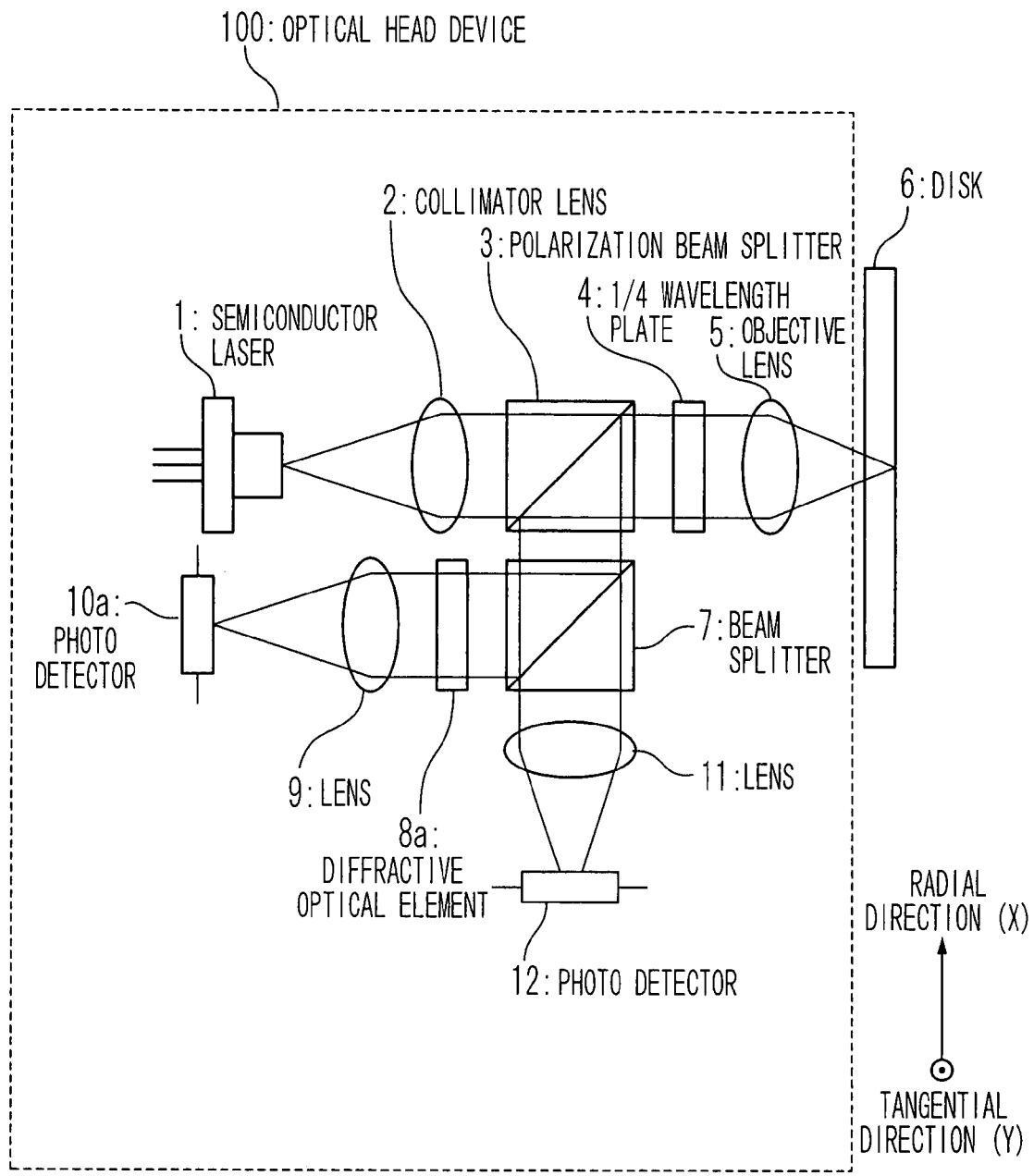
FIG. 6 is a schematic diagram showing a configuration in a first embodiment of an optical head device according to the present invention.

FIG. 6 is a schematic diagram showing a configuration in a first embodiment of the optical head device according to the present invention. The optical head device 100 includes a semiconductor laser 1, a collimator lens 2, a polarization beam splitter 3, a ¼ wavelength plate 4, an objective lens 5, a beam splitter 7, a diffractive optical element 8a, a lens 9, a photo detector 10a, a lens 11 and a photo detector 12. In the optical head device 100, a laser beam is emitted from the semiconductor laser 1 to a disk 6 as an optical recording medium having a groove, and the reflection light from the disk 6 is detected by the photo detector 10a and the photo detector 12.

The emitted light from the semiconductor laser 1 is made parallel by the collimator lens 2 and incidents as a P polarization light into the polarization beam splitter 3, and about 10.0% of the light is transmitted through the polarization beam splitter 3. The transmission light is converted from a straight polarization light into a circular polarization light through the ¼ wavelength plate 4 and then condensed onto the disk 6 by the objective lens 5. The reflection light from the disk 6 is transmitted through the ¼ wavelength plate 4 in the opposite direction via the objective lens 5 and is converted from the circular polarization light into a straight polarization light of polarization direction orthogonal to that in the outward path, and incidents as an S polarization light into the polarization beam splitter 3. About 10.0% of the incident light is reflected by the polarization beam splitter 3, incidents into the beam splitter 7 and is separated into a reflection light and a transmission light. The reflection light from the beam splitter 7 is diffracted by the diffractive optical element 8a, transmitted through the lens 9 and received by the photo detector 10a. On the other hand, the transmission light from the beam splitter 7 is transmitted through the lens 11 and received by the photo detector 12.

By the way, hereafter, the embodiments will be described under definition that an X-axis direction is a radial direction of the disk 6 and that a Y-axis direction is a tangential direction perpendicular to the radial direction. The radial direction extends through the optical axis of the incident light on the disk 6.

Figure 7:
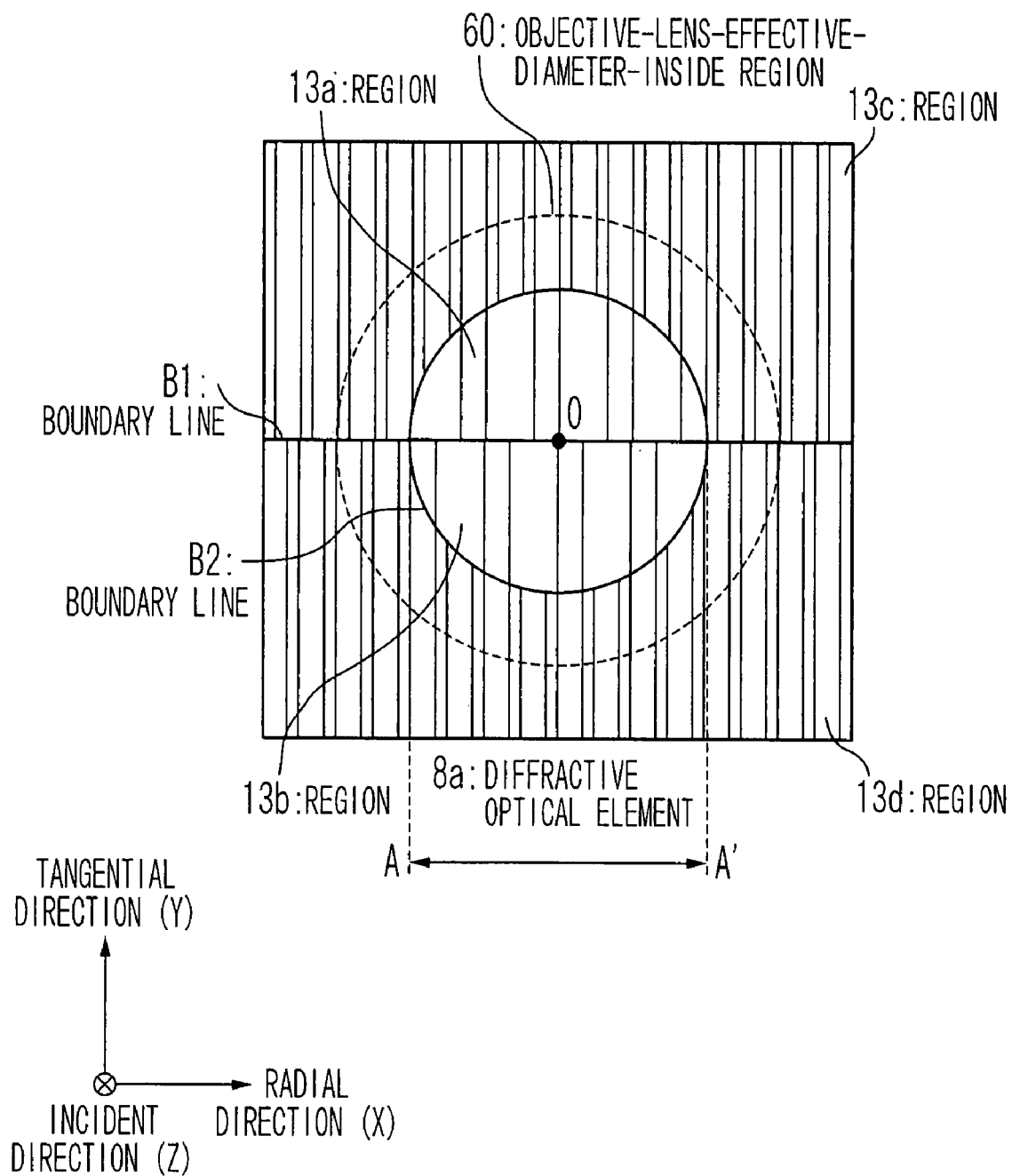
FIG. 7 is a plan view of a diffractive optical element in the first embodiment of the optical head device according to the present invention.

FIG. 7 is a plan view of the diffractive optical element 8a in the first embodiment of the optical head device according to the present invention. FIG. 7 is the view from the incident direction of the laser beam. The diffractive optical element 8a is separated into four regions by a boundary line B1 and a boundary line B2. The boundary line B1 is a straight line which extends through the optical axis (origin O) of the incident light and is parallel to the radial direction (X-axis direction) of the disk 6. The boundary line B2 forms a circle which has a diameter smaller than an effective diameter (objective-lens-effective-diameter-inside region 60) of the objective lens 5 indicated by a dotted line in the figure. The optical axis (origin O) serves as a center of the circle. A diffractive grating separated into two regions 13a and 13b by the boundary line B1 is formed inside the boundary line B2. Also, a diffractive grating separated into two regions 13c and 13d by the boundary line B1 is formed outside the boundary line B2. In each of the diffractive gratings, a grating direction is parallel to the tangential direction (Y-axis direction) of the disk 6, and a grating pattern is straight lines of a constant interval. The grating patterns in regions 13a and 13c are continuous across the boundary line B2, and the grating patterns in the regions 13b and 13d are continuous across the boundary line B2.

FIGS. 8A to 8D are sectional views of the diffractive optical element 8a in the first embodiment of the optical head device according to the present invention. The sectional views of the diffractive optical element 8a are shown with respect to A-A' (X-axis direction) shown in FIG. 7. With reference to FIG. 8A, a cross-sectional shape of the diffractive grating in the region 13a includes a repetition of a serrate portion having a width of 4P and a height decreasing from left to right between 2H and 0 and a serrate portion having a width of 2P and a height decreasing from left to right between 2H and H. With reference to FIG. 8B, a cross-sectional shape of the diffractive grating in the region 13b includes a repetition of a serrate portion having a width of 2P and a height increasing from left to right between H and 2H and a serrate portion having a width of 4P and a height increasing from left to right between 0 and 2H. With reference to FIG. 8C, a cross-sectional shape of the diffractive grating in the region 13c includes a repetition of a serrate portion having a width of P and a height decreasing from left to right between H and 0, a serrate portion having a width of 2P and a height decreasing from left to right between 2H and 0, a serrate portion having a width of P and a height decreasing from left to right between H and 0 and a serrate portion having a width of 2P and a height decreasing from left to right between 2H and 0. With reference to FIG. 8D, a cross-sectional shape of the diffractive grating in the region 13d includes a repetition of a serrate portion having a width of 2P and a height increasing from left to right between 0 and 2H, a serrate portion having a width of P and a height increasing from left to right between 0 and H, a serrate portion having a width of 2P and a height increasing from left to right between 0 and 2H and a serrate portion having a width of P and a height increasing from left to right between 0 and H. By the way, the grating interval in each of the diffractive grating is 6P.

Here, it is defined that when a wavelength of the laser beam emitted from the semiconductor laser 1 is $\lambda$ and a refraction index in the diffractive grating is n, $H=\lambda/2(n-1)$ is given. Also, with reference to FIGS. 8A to 8D, it is defined that when an outgoing direction of the light is a Z-axis and the light incidents into the diffractive optical element 8a from a substrate side to a diffractive grating side thereof, the light diffracted in the second quadrant direction in the XZ plane is a light of negative diffraction order and the light diffracted in the first quadrant direction in the XZ plane is a light of positive diffraction order. In this case, diffraction efficiencies in each of the regions 13a to 13d of the diffractive optical element 8a are described as follows. In the region 13a, −2nd order diffraction efficiency is 40.5%, −1st order diffraction efficiency is 40.5%, 0th order efficiency is 4.5%, +1st order diffraction efficiency is 1.6% and +2nd order diffraction efficiency is 0.8%. In the region 14b, −2nd order diffraction efficiency is 0.8%, −1st order diffraction efficiency is 1.6%, 0th order efficiency is 4.5%, +1st order diffraction efficiency is 40.5% and +2nd order diffraction efficiency is 40.5%. In the region 13c, −2nd order diffraction efficiency is 40.5%, −1st order diffraction efficiency is 0.0%, 0th order efficiency is 4.5%, +1st order diffraction efficiency is 0.0% and +2nd order diffraction efficiency is 1.6%. In the region 13d, −2nd order diffraction efficiency is 1.6%, −1st order diffraction efficiency is 0.0%, 0th order efficiency is 4.5%, +1st order diffraction efficiency is 0.0% and +2nd order diffraction efficiency is 40.5%. The −2nd order diffracted light from the diffractive optical element 8a includes 40.5% of the incident light to the regions 13a and 14b, the −1st order diffracted light from the diffractive optical element 8a includes 40.5% of the incident light to the region 13a, the +1st order diffracted light from the diffractive optical element 8a includes 40.5% of the incident light to the region 14b, and the +2nd order diffracted light from the diffractive optical element 8a includes 40.5% of the incident light to the regions 13b and 13d.

Figure 9A:
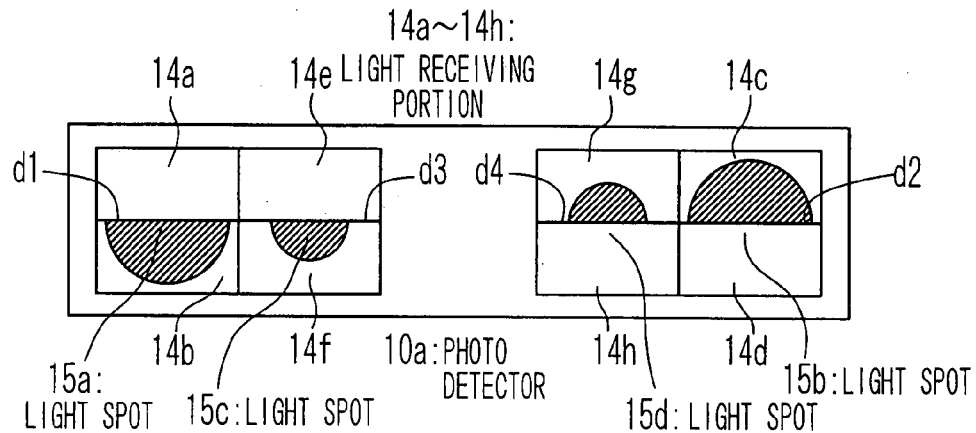
FIG. 9A shows a pattern of light receiving portions of a photo detector and an arrangement of light spots on the photo detector in the first embodiment of the optical head device according to the present invention.
Figure 9B:
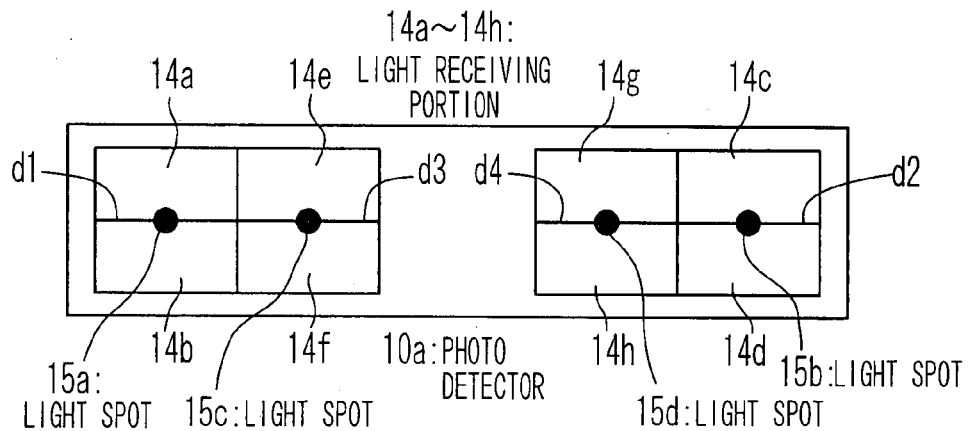
FIG. 9B shows a pattern of light receiving portions of a photo detector and an arrangement of light spots on the photo detector in the first embodiment of the optical head device according to the present invention.
Figure 9C:
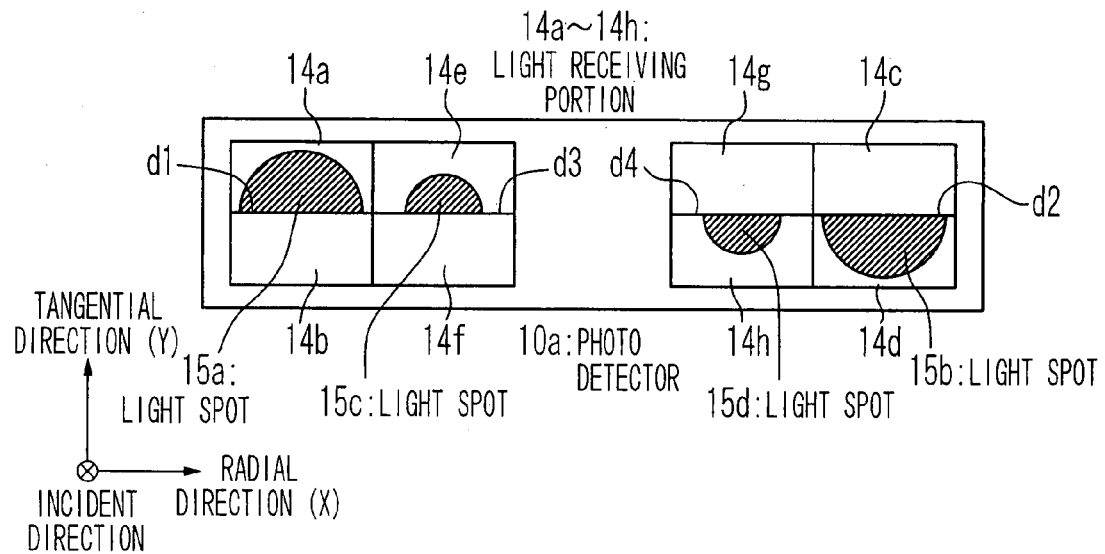
FIG. 9C shows a pattern of light receiving portions of a photo detector and an arrangement of light spots on the photo detector in the first embodiment of the optical head device according to the present invention.

FIGS. 9A to 9C shows: patterns of light receiving portions 14 of the photo detector 10a; and arrangements of light spots on the photo detector 10a, in the first embodiment of the optical head device according to the present invention. With reference to FIG. 9, the light receiving portions of the photo detector 10a includes light receiving portions 14a to 14h, each of which receives the diffracted light from the diffractive optical element 8a. FIG. 9A shows the arrangement of the light spots in the case that the disk 6 is located farther from the objective lens 5 than a just focus position, FIG. 9B shows the arrangement of the light spots in the case that the disk 6 is located at the just focus position, and FIG. 9C shows the arrangement of the light spots in the case that the disk 6 is located closer to the objective lens 5 than the just focus position. In the all cases, it is assumed that there is no protective-layer-thickness deviation in the disk 6. The light spot 15a corresponds to the −2nd order diffracted light from the regions 13a and 13c of the diffractive optical element 8a and is received by the light receiving portions 14a and 14b separated in two by a separation line d1 parallel to the radial direction (X-axis direction) of the disk 6. The light spot 15b corresponds to the +2nd order diffracted light from the regions 13b and 13d of the diffractive optical element 8a and is received by the light receiving portions 14c and 14d separated in two by a separation line d2 parallel to the radial direction (X-axis direction) of the disk 6. The light spot 15c corresponds to the −1st order diffracted light from the region 13a of the diffractive optical element 8a and is received by the light receiving portions 14e and 14f separated in two by a separation line d3 parallel to the radial direction (X-axis direction) of the disk 6. The light spot 15d corresponds to the +1st order diffracted light from the region 13b of the diffractive optical element 8a and is received by the light receiving portions 14g and 14h separated in two by a separation line d4 parallel to the radial direction (X-axis direction) of the disk 6.

With reference to FIG. 9A, when the disk 6 is located farther from the objective lens 5 than the just focus position, the light spot 15a is spread in the shape of a semicircle on the light receiving portion 14b, the light spot 15b is spread in the shape of a semicircle on the light receiving portion 14c, the light spot 15c is spread in the shape of a semicircle on the light receiving portion 14f, and the light spot 15d is spread in the shape of a semicircle on the light receiving portion 14g. With reference to FIG. 9B, when the disk 6 is located at the just focus position, the light spot 15a is converged on the separation line d1 between the light receiving portions 14a and 14b, the light spot 15b is converged on the separation line d2 between the light receiving portions 14c and 14d, the light spot 15c is converged on the separation line d3 between the light receiving portions 14e on 14f, and the light spot 15d is converged on the separation line d4 between the light receiving portions 14g and 14h. With reference to FIG. 9C, when the disk 6 is located closer to the objective lens 5 than the just focus position, the light spot 15a is spread in the shape of a semicircle on the light receiving portion 14a, the light spot 15b is spread in the shape of a semicircle on the light receiving portion 14d, the light spot 15c is spread in the shape of a semicircle on the light receiving portion 14e, and the light spot 15d is spread in the shape of a semicircle on the light receiving portion 14h.

Figure 10:
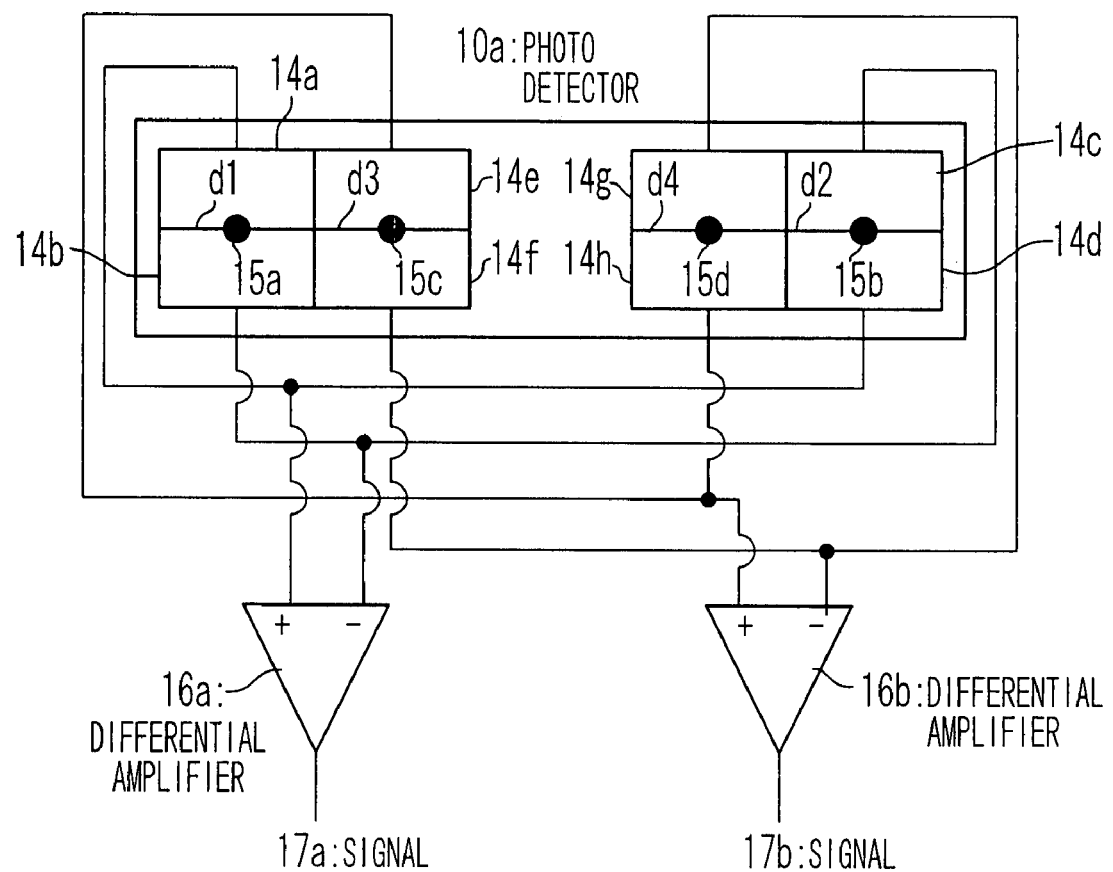
FIG. 10 is a configuration diagram of the pattern of the light receiving portions of the photo detector and a calculating circuit connected to the light receiving portions of the photo detector in the first embodiment of the optical head device according to the present invention.

FIG. 10 is a configuration diagram of the pattern of the light receiving portions of the photo detector 10a and a calculating circuit connected to the light receiving portions of the photo detector 10a in the first embodiment of the optical head device according to the present invention. Each of the light receiving portions 14a to 14d is connected to a differential amplifier 16a, and each of the light receiving portions 14e to 14h are connected to a differential amplifier 16b. Here, the outputs from the light receiving portions 14a to 14h are represented by V14a to V14h, respectively. The outputs from the light receiving portions 14a to 14d is inputted to the differential amplifier 16a, and the differential amplifier 16a calculates (V14a+V14d)−(V14b+V14c) to obtain a signal 17a. The signal 17a is a focus error signal corresponding to the entire light beam based on the knife edge method, and is used as a focus error signal FES used for a focus servo. The outputs from the light receiving portions 14e to 14h are inputted to the differential amplifier 16b, and the differential amplifier 16b calculates (V14e+V14h)−(V14f+V14g) to obtain a signal 17b. The signal 17b is a focus error signal corresponding to the inner portion of the light beam based on the knife edge method, and is used as a protective-layer-thickness-deviation signal PES indicating the protective-layer-thickness deviation of the disk 6. By the way, a track error signal and an RF signal are obtained from outputs from the photo detector 12.

Figure 11A:
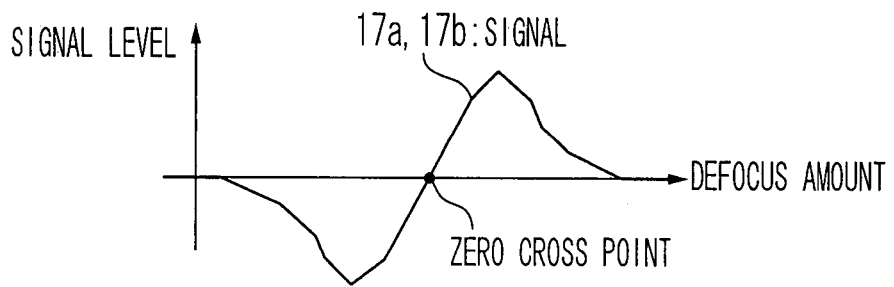
FIG. 11A shows various signals relevant to a protective-layer-thickness deviation in the first embodiment of the optical head device according to the present invention.
Figure 11B:
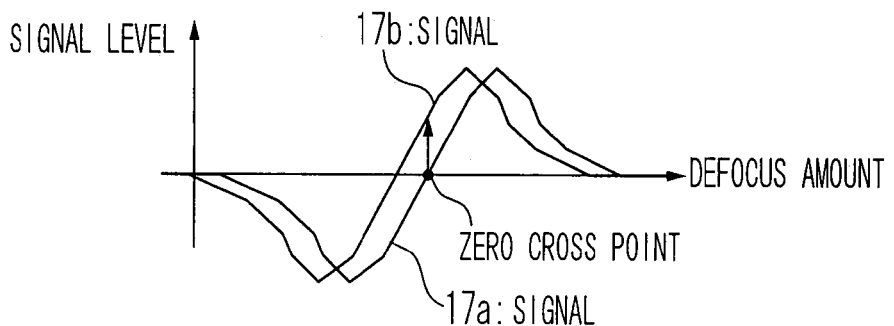
FIG. 11B shows various signals relevant to the protective-layer-thickness deviation in the first embodiment of the optical head device according to the present invention.
Figure 11C:
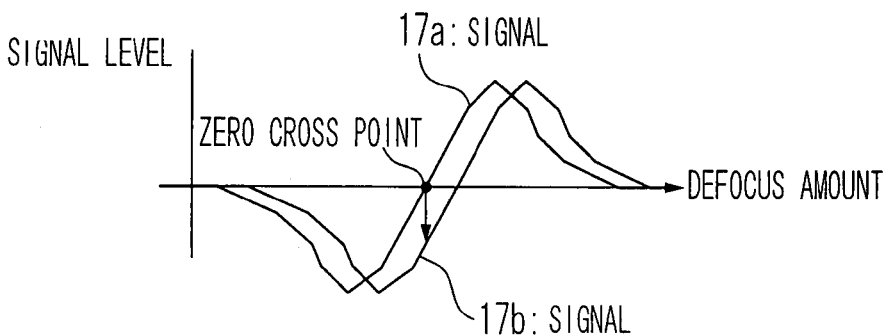
FIG. 11C shows various signals relevant to the protective-layer-thickness deviation in the first embodiment of the optical head device according to the present invention.

FIGS. 11A to 11C shows wave forms of signals 17a and 17b concerning to the detection of the protective-layer-thickness deviation, in the first embodiment of the optical head device according to the present invention. In FIGS. 11A to 11C, each horizontal axis indicates a defocus amount of the disk 6, and each longitudinal axis indicates a signal level. FIG. 11A shows the signals 17a and 17b when there is no protective-layer-thickness deviation in the disk 6. FIG. 11B shows the signals 17a and 17b when there is a positive protective-layer-thickness deviation in the disk 6. FIG. 11C shows the signals 17a, 17b when there is a negative protective-layer-thickness deviation in the disk 6. In each of FIGS. 11A to 11C, a point (zero cross point), in which the signal level is 0, of the signal 17a corresponds to the just focus. With reference to FIG. 11A, when there is no protective-layer-thickness deviation in the disk 6, the signal 17b is coincident with the signal 17a in the zero cross point and is 0 in the just focus. On the contrary, with reference to FIG. 11B, when there is the positive protective-layer-thickness deviation in the disk 6, a zero cross point of the signal 17b is replaced to the left of the figure from that of the signal 17a and the signal 17b is a positive value in the just focus. Also, with reference to FIG. 11C, when there is the negative protective-layer-thickness deviation in the disk 6, a zero cross point of the signal 17b is replaced to the right of the figure from that of the signal 17a and the signal 17b is a negative value in the just focus. Thus, the signal 17b when the signal 17a is used to perform the focus servo can be used as the protective-layer-thickness-deviation signal PES.

In the present embodiment, when there is a residual error caused by a plane displacement of the disk 6 and the like in the focus error signal FES (signal 17a) used for the focus servo, an offset of the focus error signal (signal 17b) which indicates the protective-layer-thickness deviation and corresponds to the inner portion of the light beam is caused by the residual error. However, when the signal obtained by subtracting the focus error signal FES (signal 17a) used for the focus servo from the focus error signal (signal 17b) corresponding to the inner portion of the light beam is used as the protective-layer-thickness-deviation signal PES, the protective-layer-thickness deviation can be detected without an offset of the protective-layer-thickness-deviation signal PES caused by the residual error.

An embodiment of the optical head device according to the present invention is considered that the diffractive optical element 8a of the optical head device according to the first embodiment is replaced with a diffractive optical element in which +1st order or −1st order diffracted light and +2nd order or −2nd order diffracted light are generated mainly in a region outside a circle and +2nd order or −2nd order diffracted light is generated in a region outside the circle. The optical axis of the incident light serves as the center of the circle. As for this case, similarly to the first embodiment, in the photo detector 10a, the focus error signal FES used for the focus servo is obtained from the output of the light receiving portion for receiving the ±2nd order diffracted lights from the diffractive optical element and the protective-layer-thickness-deviation signal PES is obtained from the output of the light receiving portion for receiving the ±1st order diffracted lights from the diffractive optical element.

Second Embodiment of Optical Head Device

Figure 12:
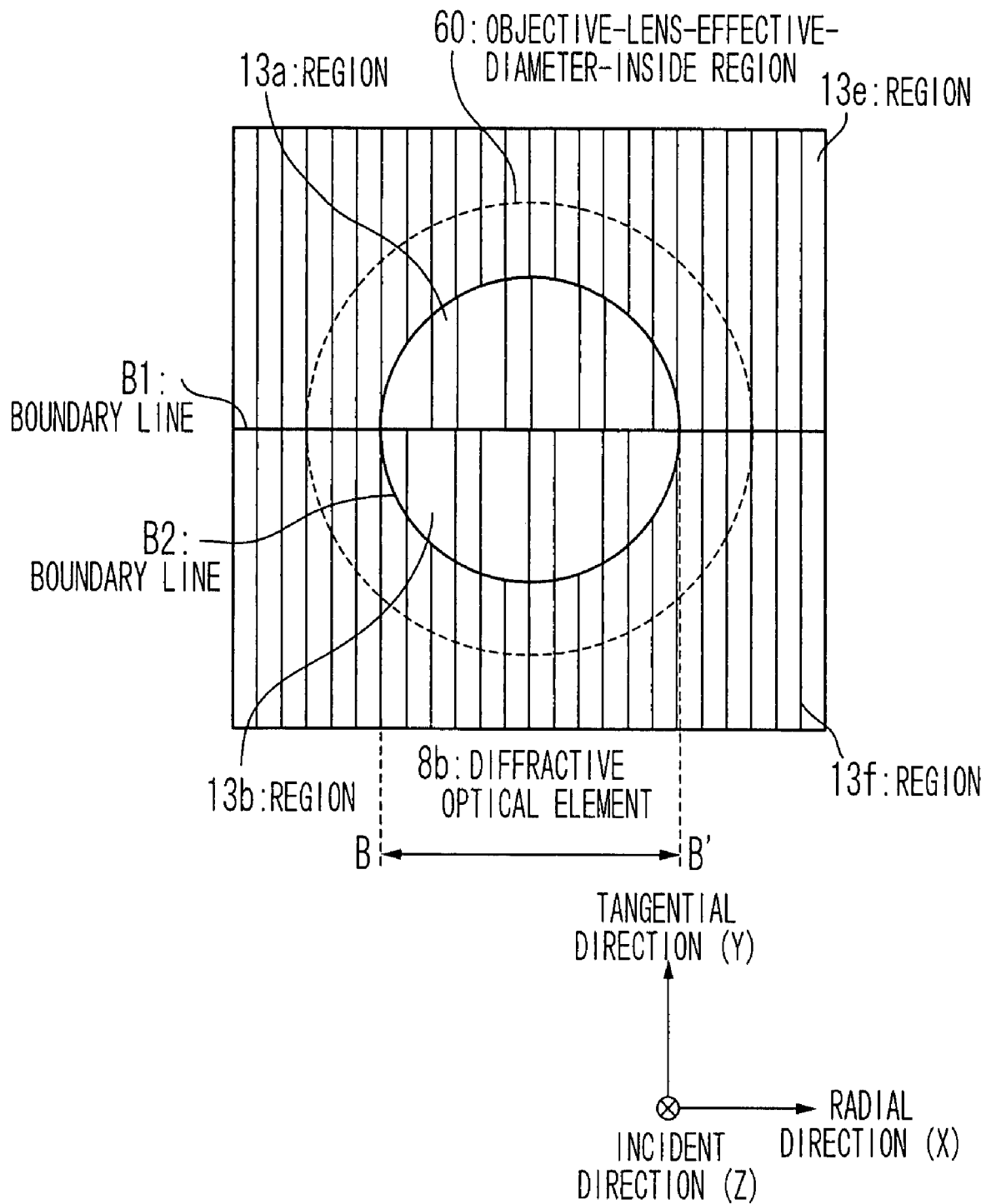
FIG. 12 is a plan view of a diffractive optical element in a second embodiment of the optical head device according to the present invention.

With reference to FIG. 6, in a configuration in a second embodiment of the optical head device according to the present invention, the diffractive optical element 8a of the optical head device according to the first embodiment is replaced with a diffractive optical element 8b. FIG. 12 is a plan view of the diffractive optical element 8b in the second embodiment of the optical head device according to the present invention. FIG. 12 is the view from the incident direction of the laser beam. The diffractive optical element 8b is separated into the four regions by a boundary line B1 and a boundary line B2. The boundary line B1 is a straight line which extends through the optical axis (origin O) of the incident light and is parallel to the radial direction (X-axis direction) of the disk 6. The boundary line B2 forms a circle which has a diameter smaller than the effective diameter (objective-lens-effective-diameter-inside region 60) of the objective lens 5 indicated by a dotted line in the figure. The optical axis (origin O) serves as a center of the circle. A diffractive grating separated into two regions 13a and 13b by the boundary line B1 is formed inside the boundary line B2. Also, a diffractive grating separated into two regions 13e and 13f by the boundary line B1 is formed outside the boundary line B2. In each of the diffractive gratings, a grating direction is parallel to the tangential direction (Y-axis direction) of the disk 6, and a grating pattern is straight lines of a constant interval. The grating patterns in regions 13a and 13e are continuous across the boundary line B2, and the grating patterns in the regions 13b and 13f are continuous across the boundary line B2.

Figure 13A:
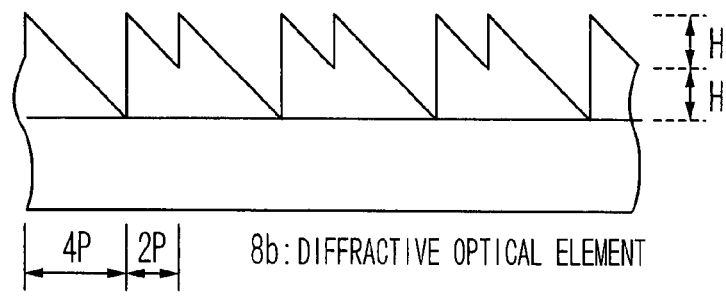
FIG. 13A is a sectional view of the diffractive optical element in the second embodiment of the optical head device according to the present invention.
Figure 13B:
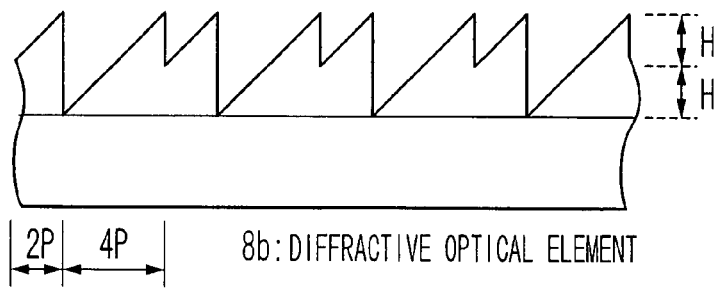
FIG. 13B is a sectional view of the diffractive optical element in the second embodiment of the optical head device according to the present invention.
Figure 13C:
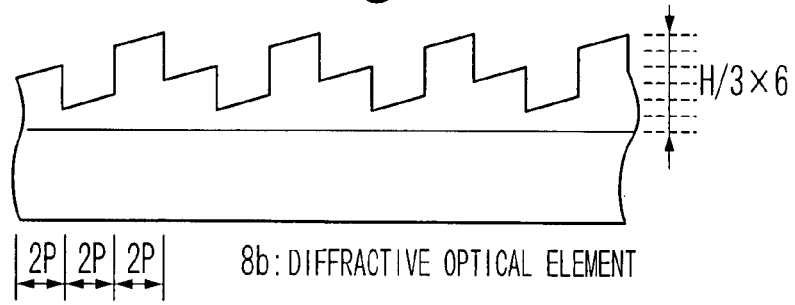
FIG. 13C is a sectional view of the diffractive optical element in the second embodiment of the optical head device according to the present invention.
Figure 13D:
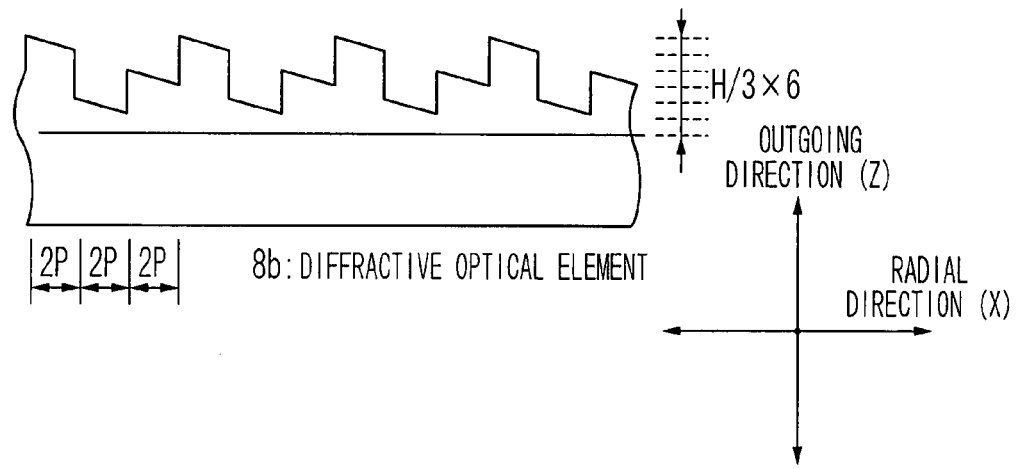
FIG. 13D is a sectional view of the diffractive optical element in the second embodiment of the optical head device according to the present invention.

FIGS. 13A to 13D are sectional views of the diffractive optical element in the second embodiment of the optical head device according to the present invention. The sectional views of the diffractive optical element 8b are shown with respect to B-B' (X-axis direction) shown in FIG. 12. With reference to FIG. 13A, a cross-sectional shape of the diffractive grating in the region 13a includes a repetition of a serrate portion having a width of 4P and a height decreasing from left to right between 2H and 0 and a serrate portion having a width of 2P and a height decreasing from left to right between 2H and H. With reference to FIG. 13B, a cross-sectional shape of the diffractive grating in the region 13b includes a repetition of a serrate portion having a width of 2P and a height increasing from left to right between H and 2H and a serrate portion having a width of 4P and a height increasing from left to right between 0 and 2H. With reference to FIG. 13C, a cross-sectional shape of the diffractive grating in the region 13e includes a repetition of a serrate portion having a width of 2P and a height increasing from left to right between H and 4H/3, a serrate portion having a width of 2P and a height increasing from left to right between H/3 and 2H/3, and a serrate portion having a width of 2P and a height increasing from left to right between 5H/3 and 2H. With reference to FIG. 13D, a cross-sectional shape of the diffractive grating in the region 13f includes a repetition of a serrate portion having a width of 2P and a height decreasing from left to right between 2H and 5H/3, a serrate portion having a width of 2P and a height decreasing from left to right between 2H/3 and H/3, and a serrate portion having a width of 2P and a height decreasing from left to right between 4H/3 and H. By the way, the grating interval in each of the diffractive grating is 6P.

Here, it is defined that when a wavelength of the laser beam emitted from the semiconductor laser 1 is $\lambda$ and a refraction index in the diffractive grating is n, $H=\lambda/2(n-1)$ is given. Also, with reference to FIGS. 13A to 13D, it is defined that when an outgoing direction of the light is a Z-axis and the light incidents into the diffractive optical element 8b from a substrate side to a diffractive grating side thereof, the light diffracted in the second quadrant direction in the XZ plane is a light of negative diffraction order and the light diffracted in the first quadrant direction in the XZ plane is a light of positive diffraction order. In this case, diffraction efficiencies in each of the regions 13a, 14b, 13e and 13f of the diffractive optical element 8b are described as follows. In the region 13a, −2nd order diffraction efficiency is 40.5%, −1st order diffraction efficiency is 40.5%, 0th order efficiency is 4.5%, +1st order diffraction efficiency is 1.6% and +2nd order diffraction efficiency is 0.8%. In the region 14b, −2nd order diffraction efficiency is 0.8%, −1st order diffraction efficiency is 1.6%, 0th order efficiency is 4.5%, +1st order diffraction efficiency is 40.5% and +2nd order diffraction efficiency is 40.5%. In the region 13e, −2nd order diffraction efficiency is 0.0%, −1st order diffraction efficiency is 40.5%, 0th order efficiency is 0.0%, +1st order diffraction efficiency is 0.0% and +2nd order diffraction efficiency is 40.5%. In the region 13f, −2nd order diffraction efficiency is 40.5%, −1st order diffraction efficiency is 0.0%, 0th order efficiency is 0.0%, +1st order diffraction efficiency is 40.5% and +2nd order diffraction efficiency is 0.0%. The −2nd order diffracted light from the diffractive optical element 8b includes 40.5% of the incident light to the regions 13a and 13f, the −1st order diffracted light from the diffractive optical element 8b includes 40.5% of the incident light to the regions 13a and 13e, the +1st order diffracted light from the diffractive optical element 8b includes 40.5% of the incident light to the regions 13b and 13f, and the +2nd order diffracted light from the diffractive optical element 8b includes 40.5% of the incident lights to the regions 13b and 13e.

FIGS. 14A to 14C shows: patterns of light receiving portions of the photo detector 10a; and arrangements of light spots on the photo detector 10a, in the second embodiment of the optical head device according to the present invention. The light receiving portions of the photo detector 10a includes light receiving portions 14a to 14h, each of which receives the diffracted light from the diffractive optical element 8b. FIG. 14A shows the arrangement of the light spots in the case that the disk 6 is located farther from the objective lens 5 than a just focus position, FIG. 14B shows the arrangement of the light spots in the case that the disk 6 is located at the just focus position, and FIG. 14C shows the arrangement of the light spots in the case that the disk 6 is located closer to the objective lens 5 than the just focus position. In the all cases, it is assumed that there is no protective-layer-thickness deviation in the disk 6. The light spot 15e corresponds to the −1st order diffracted light from the regions 13a and 13e of the diffractive optical element 8b and is received by the light receiving portions 14e and 14f separated in two by a separation line d3 parallel to the radial direction (X-axis direction) of the disk 6. The light spot 15f corresponds to the +1st order diffracted light from the regions 13b and 13f of the diffractive optical element 8b and is received by the light receiving portions 14g and 14h separated in two by a separation line d4 parallel to the radial direction (X-axis direction) of the disk 6. The light spot 15g corresponds to the −2nd order diffracted light from the regions 13a and 13f of the diffractive optical element 8b and is received by the light receiving portions 14a and 14b separated in two by a separation line d1 parallel to the radial direction (X-axis direction) of the disk 6. The light spot 15h corresponds to the +2nd order diffracted light from the regions 13b and 13e of the diffractive optical element 8b and is received by the light receiving portions 14c and 14d separated in two by a separation line d2 parallel to the radial direction (X-axis direction) of the disk 6.

With reference to FIG. 14A, when the disk 6 is located farther from the objective lens 5 than the just focus position, the light spot 15e is spread in the shape of a semicircle on the light receiving portion 14f, the light spot 15f is spread in the shape of a semicircle on the light receiving portion 14g, the light spot 15g is spread in the shape of a semicircle on the light receiving portion 14b and spread in the shape of a half-ring band on the light receiving portion 14b, and the light spot 15h is spread in the shape of a semicircle on the light receiving portion 14c and spread in the shape of a half-ring band on the light receiving portion 14d. With reference to FIG. 9B, when the disk 6 is located at the just focus position, the light spot 15e is converged on the separation line d3 between the light receiving portions 14e and 14f, the light spot 15f is converged on the separation line d4 between the light receiving portions 14g and 14h, the light spot 15g is converged on the separation line d1 between the light receiving portions 14a on 14b, and the light spot 15h is converged on the separation line d2 between the light receiving portions 14c and 14d. With reference to FIG. 9C, when the disk 6 is located closer to the objective lens 5 than the just focus position, the light spot 15e is spread in the shape of a semicircle on the light receiving portion 14e, the light spot 15f is spread in the shape of a semicircle on the light receiving portion 14h, the light spot 15g is spread in the shape of a semicircle on the light receiving portion 14a and spread in the shape of a half-ring band on the light receiving portion 14a, and the light spot 15h is spread in the shape of a semicircle on the light receiving portion 14d and spread in the shape of a half-ring band on the light receiving portion 14c.

Figure 15:
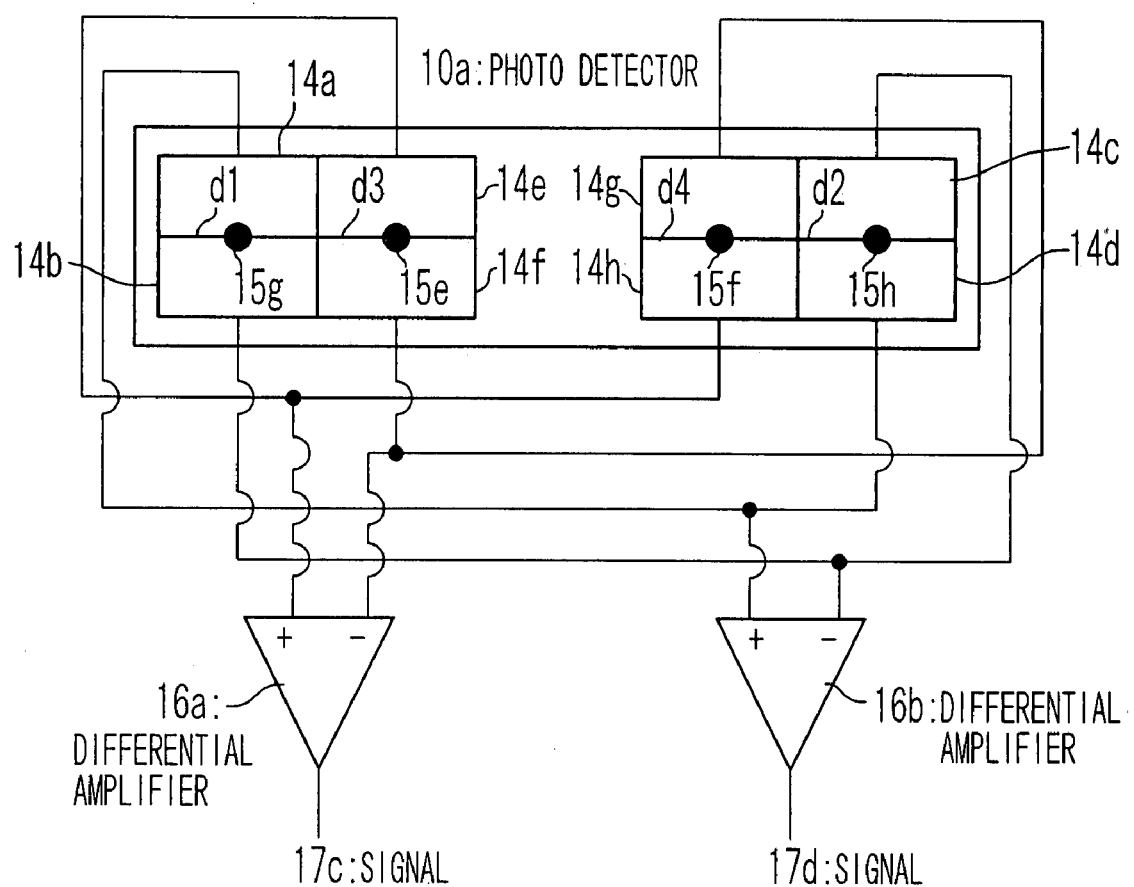
FIG. 15 is a configuration diagram showing the pattern of the light receiving portions of the photo detector and a calculating circuit connected to the light receiving portions of the photo detector in the second embodiment of the optical head device according to the present invention.

FIG. 15 is a configuration diagram of the pattern of the light receiving portions of the photo detector and a calculating circuit connected to the light receiving portions of the photo detector in the second embodiment of the optical head device according to the present invention. Each of the light receiving portions 14e to 14h is connected to a differential amplifier 16a, and each of the light receiving portions 14a to 14d is connected to a differential amplifier 16b. Here, the outputs from the light receiving portions 14a to 14h are represented by V14a to V14h, respectively. The outputs from the light receiving portions 14e to 14h are inputted to the differential amplifier 16a, and the differential amplifier 16a calculates (V14e+V14h)−(V14f+V14g) to obtain a signal 17c. The signal 17c is a focus error signal corresponding to the entire light beam based on the knife edge method, and is used as a focus error signal FES used for a focus servo. The outputs from the light receiving portions 14a to 14d are inputted to the differential amplifier 16b, and the differential amplifier 16b calculates (V14a+V14d)−(V14b+V14c) to obtain a signal 17d. The signal 17d, based on the knife edge method, is a difference between a focus error signal 18a (V14b+V14c) corresponding to the inner portion of the light beam and a focus error signal 18b (V14a+V14d) corresponding to the outer portion of the light beam, and is used as a protective-layer-thickness-deviation signal PES indicating the protective-layer-thickness deviation of the disk 6. By the way, a track error signal and an RF signal are obtained from outputs from the photo detector 12.

Figure 16A:
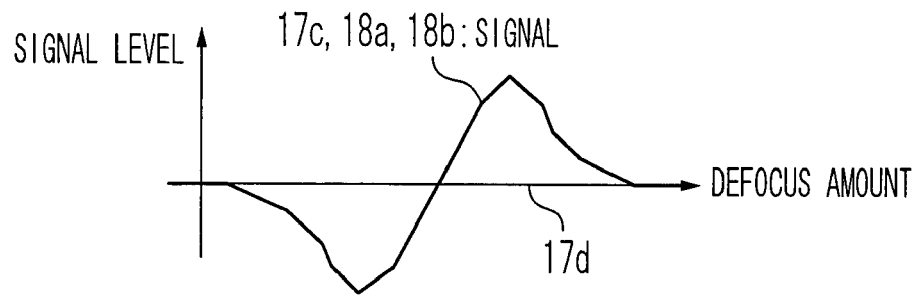
FIG. 16A shows various signals relevant to a protective-layer-thickness deviation in the second embodiment of the optical head device according to the present invention.
Figure 16B:
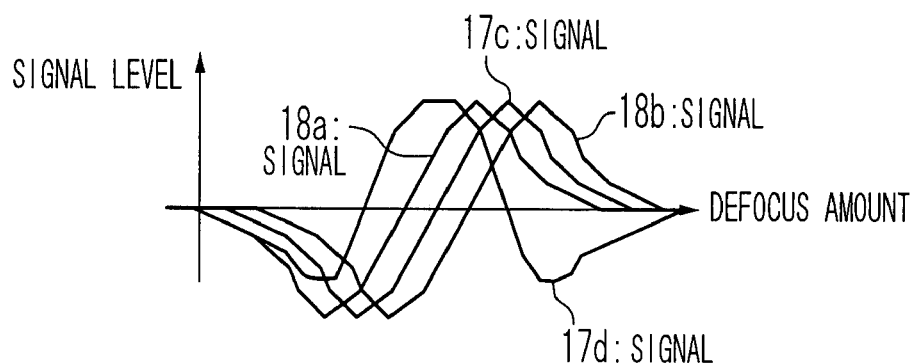
FIG. 16B shows various signals relevant to the protective-layer-thickness deviation in the second embodiment of the optical head device according to the present invention.
Figure 16C:
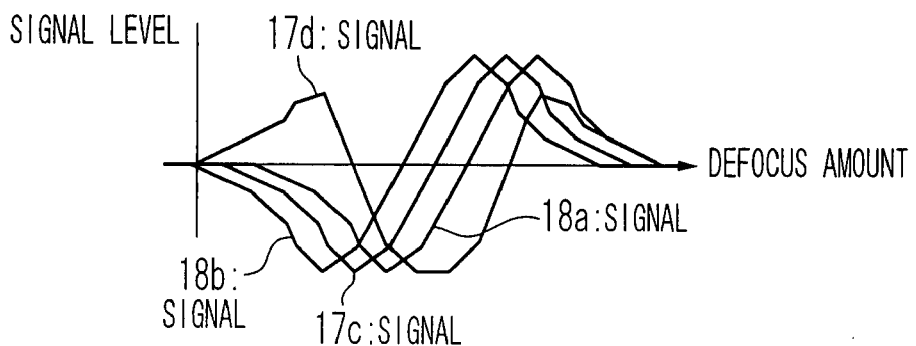
FIG. 16C shows various signals relevant to the protective-layer-thickness deviation in the second embodiment of the optical head device according to the present invention.

FIGS. 16A to 16C shows various signals concerning to the detection of the protective-layer-thickness deviation, in the second embodiment of the optical head device according to the present invention. Each horizontal axis indicates a defocus amount of the disk 6, and each longitudinal axis indicates a signal level. FIG. 16A shows the signal 17c, the signal 17d, the signal 18a as a focus error signal corresponding to the inner portion of the light beam, and the signal 18b as a focus error signal corresponding to the outer portion of the light beam, when there is no protective-layer-thickness deviation in the disk 6. The signal 17d is the difference between the signal 18a and the signal 18b, and thus is always 0. FIG. 16B shows the signal 17c, the signal 17d, the signal 18a as a focus error signal corresponding to the inner portion of the light beam, and the signal 18b as a focus error signal corresponding to the outer portion of the light beam, when there is a positive protective-layer-thickness deviation in the disk 6. FIG. 16C shows the signal 17a, the signal 17b, the signal 18a as a focus error signal corresponding to the inner portion of the light beam, and the signal 18b as a focus error signal corresponding to the outer portion of the light beam, when there is a negative protective-layer-thickness deviation in the disk 6. A position in which the signal 17c intersects a zero point corresponds to the just focus. With reference to FIG. 16A, when there is no protective-layer-thickness deviation in the disk 6, the signal 17d is always 0, and thus is 0 in the just focus. On the contrary, with reference to FIG. 16B, when there is the positive protective-layer-thickness deviation in the disk 6, the signal 17d is a positive value in the just focus. Also, with reference to FIG. 16C, when there is the negative protective-layer-thickness deviation in the disk 6, the signal 17d is a negative value in the just focus. Thus, the signal 17d when the signal 17c is used to perform the focus servo can be used as the protective-layer-thickness-deviation signal PES.

In the present embodiment, the difference (signal 17d) between the focus error signal (signal 18a) corresponding to the inner portion of the light beam and the focus error signal (signal 18b) corresponding to the outer portion of the light beam is used as the protective-layer-thickness-deviation signal PES. Thus, even if there is a residual error caused by a plane displacement of the disk 6 and the like in the focus error signal (signal 17c) used for the focus servo, an offset of the focus error signal (signal 18a) caused by the residual error and an offset of the focus error signal (signal 18b) caused by the residual error are canceled, and thus, the protective-layer-thickness deviation can be detected without an offset of the protective-layer-thickness-deviation signal PES caused by the residual error.

Third Embodiment of Optical Head Device

Figure 17:
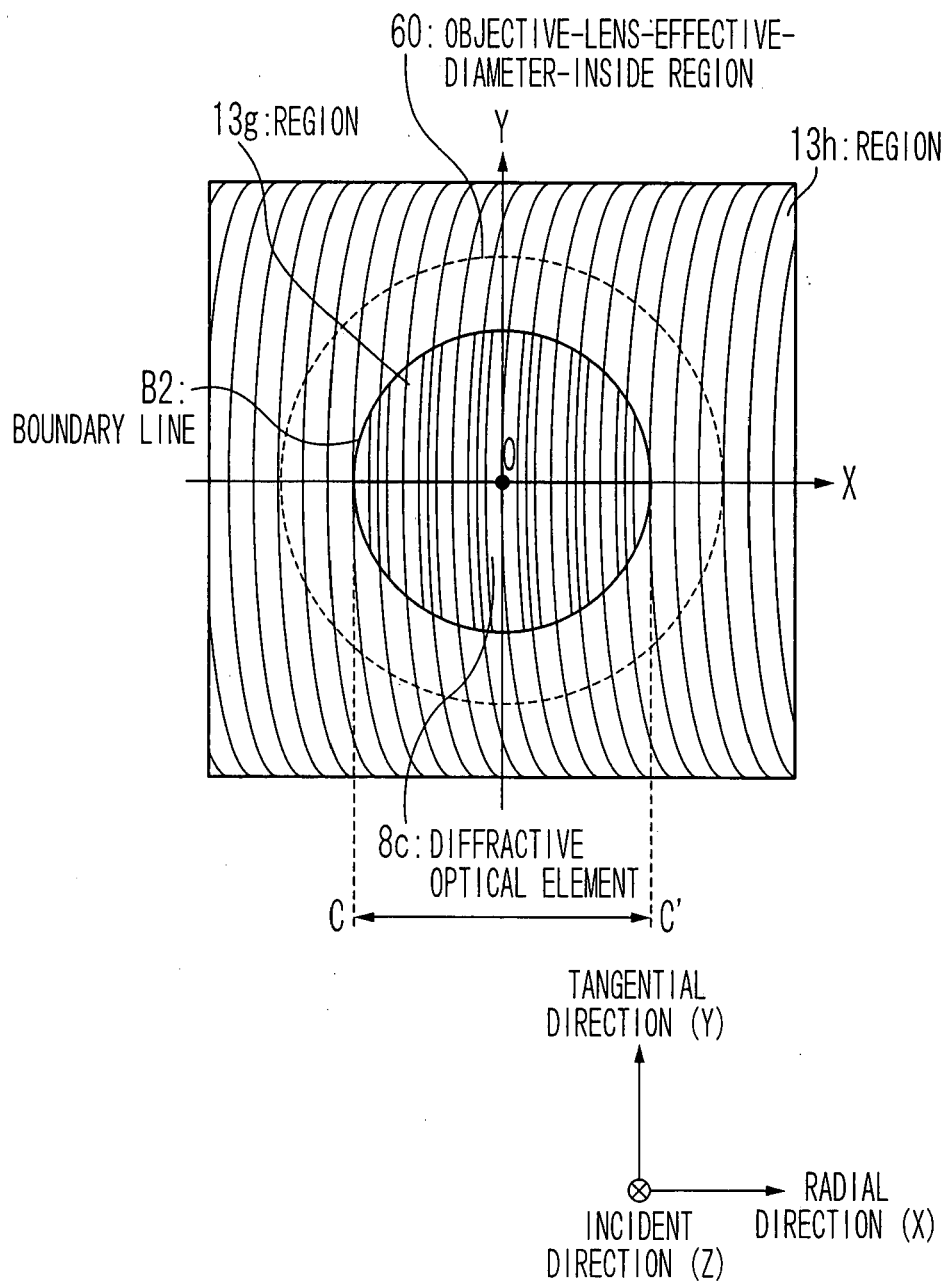
FIG. 17 is a plan view of a diffractive optical element in a third embodiment of the optical head device according to the present invention.

With reference to FIG. 6, in a configuration in a third embodiment of the optical head device according to the present invention, the diffractive optical element 8a and the photo detector 10a of the optical head device according to the first embodiment are replaced with a diffractive optical element 8c and a photo detector 10b, respectively. FIG. 17 is a plan view of the diffractive optical element 8c in the third embodiment of the optical head device according to the present invention. FIG. 17 is the view from the incident direction of the laser beam. The diffractive optical element 8c includes diffractive gratings formed in a region 13g inside a boundary line B2 and in a region 13h outside the boundary line B2. The boundary line B2 forms a circle which has a diameter smaller than the effective diameter (objective-lens-effective-diameter-inside region 60) of the objective lens 5 indicated by a dotted line in the figure. The optical axis (origin O) serves as a center of the circle. In each of the diffractive gratings, a grating direction is almost parallel to the tangential direction (Y-axis direction) of the disk 6, and a grating pattern is concentric circle lines of which a center is offset from the optical axis. The grating patterns in the regions 13g and 13h are continuous across the boundary line B2.

Figure 18A:
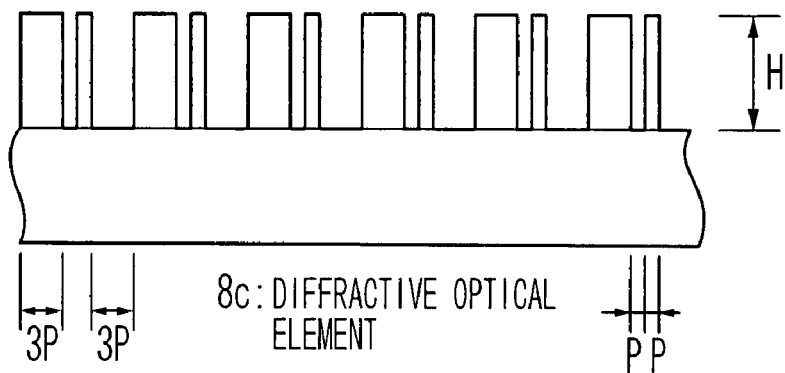
FIG. 18A is a sectional view of the diffractive optical element in the third embodiment of the optical head device according to the present invention.
Figure 18B:
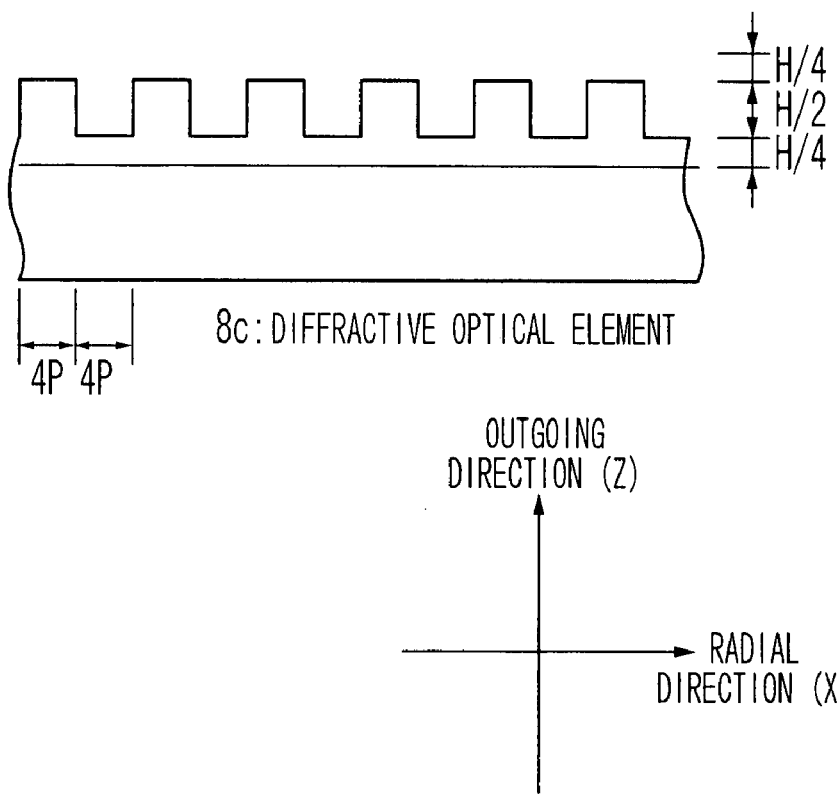
FIG. 18B is a sectional view of the diffractive optical element in the third embodiment of the optical head device according to the present invention.

FIGS. 18A and 18B are sectional views of the diffractive optical element in the third embodiment of the optical head device according to the present invention. The sectional views of the diffractive optical element 8c are shown with respect to C-C' (X-axis direction) shown in FIG. 17. With reference to FIG. 18A, a cross-sectional shape of the diffractive grating in the region 13g includes a repetition of a line portion having a width of 3P and a height of H, a space portion having a width of P and a height of 0, a line portion having a width of P and a height of H, and a space portion having a width of 3P and a height of 0. With reference to FIG. 18B, a cross-sectional shape of the diffractive grating in the region 13h includes a repetition of a line portion having a width of 4P and a height of 3H/4, a space portion having a width of 4P and a height of H/4. By the way, the grating interval in each of the diffractive grating is 8P. However, P varies depending on the position in the surface.

Here, it is defined that when a wavelength of the laser beam emitted from the semiconductor laser 1 is $\lambda$ and a refraction index in the diffractive grating is n, $H=\lambda/(2n-1)$ is given. Also, with reference to FIGS. 18A and 18B, it is defined that when an outgoing direction of the light is a Z-axis and the light incidents into the diffractive optical element 8c from a substrate side to a diffractive grating side thereof, the light diffracted in the second quadrant direction in the XZ plane is a light of negative diffraction order and the light diffracted in the first quadrant direction in the XZ plane is a light of positive diffraction order. In this case, diffraction efficiencies in each of the regions 13g and 13h of the diffractive optical element 8c are described as follows. In the region 13g, 0th order efficiency is 0.0%, each of +1st order efficiencies is 20.3%, and each of +2nd order efficiencies is 0.0%. In the region 13h, 0th order efficiency is 50.0%, each of ±1st order efficiencies is 20.3%, and each of ±2nd order efficiencies is 0.0%. The ±1st order diffracted lights from the diffractive optical element 8c include 20.3% of the incident lights to the regions 13g and 13h, respectively. Each of the ±2nd order diffracted lights from the diffractive optical element 8c includes 10.1% of the incident light to the region 13g. The diffractive optical element 8c functions as a concave lens for the lights of negative diffraction order and as a convex lens for the lights of positive diffraction order.

Figure 19A:
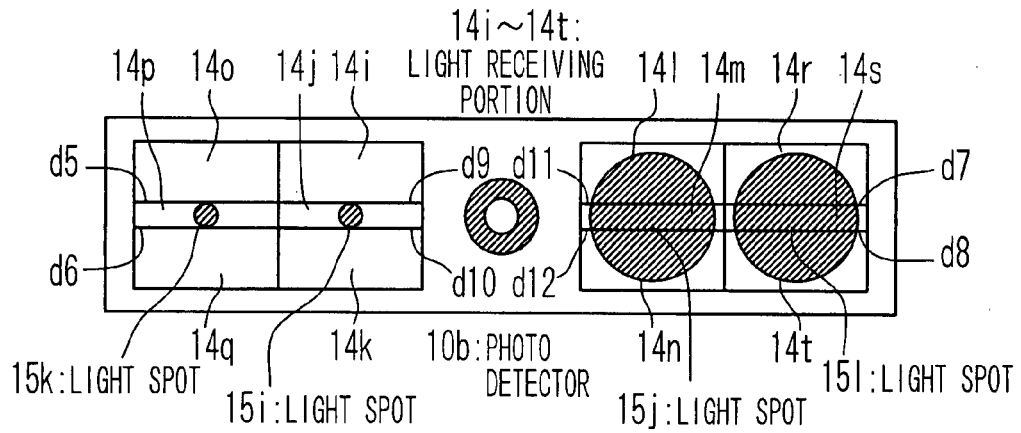
FIG. 19A shows a pattern of light receiving portions of a photo detector and an arrangement of light spots on the photo detector in the third embodiment of the optical head device according to the present invention.
Figure 19B:
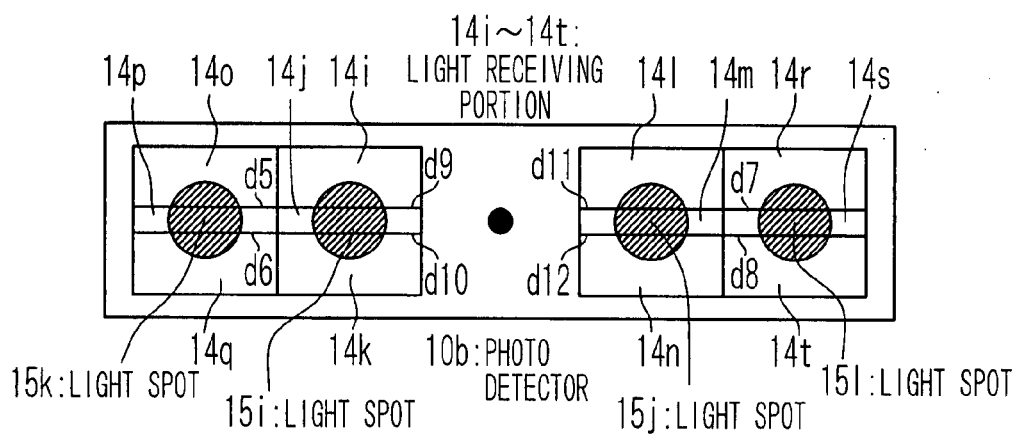
FIG. 19B shows a pattern of light receiving portions of a photo detector and an arrangement of light spots on the photo detector in the third embodiment of the optical head device according to the present invention.
Figure 19C:
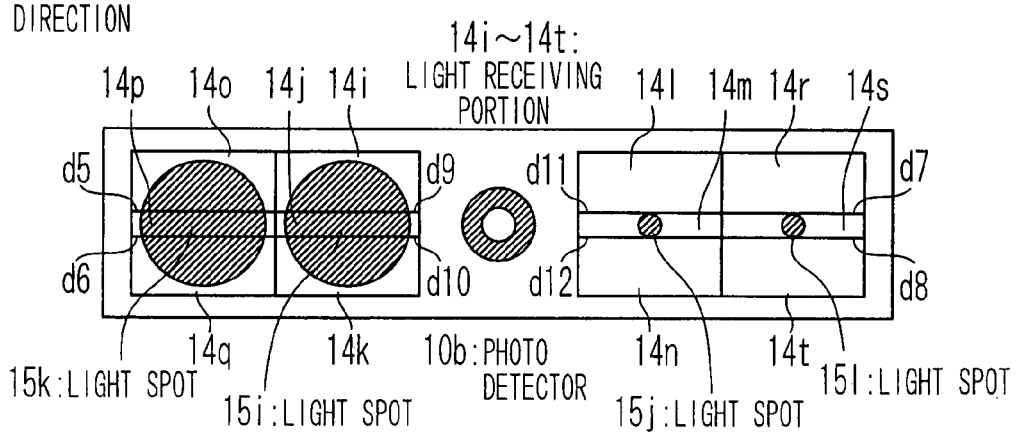
FIG. 19C shows a pattern of light receiving portions of a photo detector and an arrangement of light spots on the photo detector in the third embodiment of the optical head device according to the present invention.

FIGS. 19A to 19C shows: patterns of light receiving portions of the photo detector 10b; and arrangements of light spots on the photo detector 10b, in the third embodiment of the optical head device according to the present invention. The light receiving portions of the photo detector 10b includes light receiving portions 14i to 14t, each of which receives the diffracted light from the diffractive optical element 8c. FIG. 19A shows the arrangement of the light spots in the case that the disk 6 is located farther from the objective lens 5 than a just focus position, FIG. 19B shows the arrangement of the light spots in the case that the disk 6 is located at the just focus position, and FIG. 19C shows the arrangement of the light spots in the case that the disk 6 is located closer to the objective lens 5 than the just focus position. In the all cases, it is assumed that there is no protective-layer-thickness deviation in the disk 6. The light spot 15i corresponds to the −1st order diffracted light from the regions 13g and 13h of the diffractive optical element 8c and is received by the light receiving portions 14i, 14j and 14k separated in three by two separation lines d9 and d10 parallel to the radial direction (X-axis direction) of the disk 6. The light receiving portions 14i, 14j and 14k are arranged along the tangential direction (Y-axis direction) in that order. The light receiving portion 14i corresponds to the upper portion of the tangential direction. The light spot 15j corresponds to the +1st order diffracted lights from the regions 13g and 13h of the diffractive optical element 8c and is received by the light receiving portions 14l, 14m and 14n separated in three by two separation lines d11 and d12 parallel to the radial direction (X-axis direction) of the disk 6. The light receiving portions 14l, 14m and 14n are arranged along the tangential direction (Y-axis direction) in that order. The light receiving portion 14l corresponds to the upper portion of the tangential direction. The light spot 15k corresponds to the −2nd order diffracted light from the region 13g of the diffractive optical element 8c and is received by the light receiving portions 14o, 14p and 14q separated in three by two separation lines d5 and d6 parallel to the radial direction (X-axis direction) of the disk 6. The light receiving portions 14o, 14p and 14q are arranged along the tangential direction (Y-axis direction) in that order. The light receiving portion 14o corresponds to the upper portion of the tangential direction. The light spot 15l corresponds to the +2nd order diffracted light from the region 13g of the diffractive optical element 8c and is received by the light receiving portions 14r, 14s and 14t separated in three by two separation lines d7 and d8 parallel to the radial direction (X-axis direction) of the disk 6. The light receiving portions 14r, 14s and 14t are arranged along the tangential direction (Y-axis direction) in that order. The light receiving portion 14r corresponds to the upper portion of the tangential direction.

With reference to FIG. 19A, when the disk 6 is located farther from the objective lens 5 than the just focus position, the light spot 15i is smaller than the light spot 15j in diameter and the light spot 15k is smaller than the light spot 15l in diameter. With reference to FIG. 19B, when the disk 6 is located at the just focus position, the light spot 15i is equal to the light spot 15j in diameter and the light spot 15k is equal to the light spot 15l in diameter. With reference to FIG. 19C, when the disk 6 is located closer to the objective lens 5 than the just focus position, the light spot 15i is larger than the light spot 15j in diameter and the light spot 15k is larger than the light spot 15l in diameter.

Figure 20:
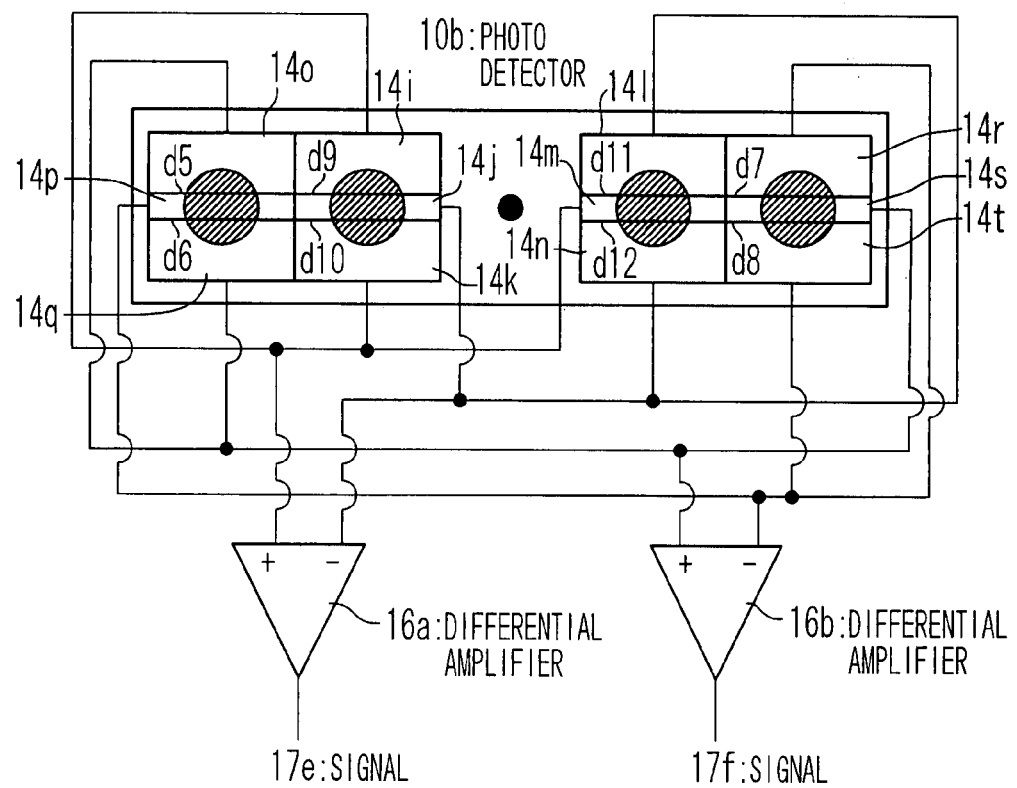
FIG. 20 is a configuration diagram showing the pattern of the light receiving portions of the photo detector and a calculating circuit connected to the light receiving portions of the photo detector in the third embodiment of the optical head device according to the present invention.

FIG. 20 is a configuration diagram of the pattern of the light receiving portions of the photo detector 10b and a calculating circuit connected to the light receiving portions of the photo detector 10b in the third embodiment of the optical head device according to the present invention. Each of the light receiving portions 14i to 14n is connected to a differential amplifier 16a, and each of the light receiving portions 14o to 14t is connected to a differential amplifier 16b. Here, the outputs from the light receiving portions 14i to 14t are represented by V14i to V14t, respectively. The outputs from the light receiving portions 14i to 14n are inputted to the differential amplifier 16a, and the differential amplifier 16a calculates (V14i+V14k+V14m)−(V14j+V14l+V14n) to obtain a signal 17e. The signal 17a is a focus error signal corresponding to the entire light beam based on a spot size method, and is used as a focus error signal FES used for a focus servo. The outputs from the light receiving portions 14o to 14t are inputted to the differential amplifier 16b, and the differential amplifier 16b calculates (V14o+V14q+V14s)−(V14p+V14r+V14t) to obtain a signal 17f. The signal 17b is a focus error signal corresponding to the inner portion of the light beam based on the spot size method, and is used as a protective-layer-thickness-deviation signal PES indicating the protective-layer-thickness deviation of the disk 6. By the way, a track error signal and an RF signal are obtained from outputs from the photo detector 12.

The relation between the signal levels and defocuses in the signals 17e and 17f concerning to the detection of the protective-layer-thickness deviation in the present embodiment is the same as that in the signals 17a and 17b according to the first embodiment shown in FIGS. 11A to 11B. In the present embodiment, based on the same principle as the principle described with reference to FIGS. 11A to 11C for the first embodiment, the signal 17f when the signal 17e is used to perform the focus servo can be used as the protective-layer-thickness-deviation signal PES.

In the present embodiment, when there is a residual error caused by a plane displacement of the disk 6 and the like in the focus error signal FES (signal 17e) used for the focus servo, an offset of the focus error signal (signal 17f) which indicates the protective-layer-thickness deviation and corresponds to the inner portion of the light beam is caused by the residual error. However, when the signal obtained by subtracting the focus error signal FES (signal 17e) used for the focus servo from the focus error (signal 17f) which indicates the protective-layer-thickness deviation and corresponds to the inner portion of the light beam is used as the protective-layer-thickness-deviation signal PES, the protective-layer-thickness deviation can be detected without an offset of the protective-layer-thickness-deviation signal PES caused by the residual error.

An embodiment of the optical head device according to the present invention is considered that the diffractive optical element 8c according to the third embodiment is replaced with a diffractive optical element in which ±1st order diffracted lights and ±2nd order diffracted lights are generated mainly in a region outside a circle and ±2nd order diffracted lights are generated in a region inside the circle. The optical axis of the incident light serves as the center of the circle. As for this case, similarly to the third embodiment, in the photo detector 10b, the focus error signal FES used for the focus servo is obtained from the output of the light receiving portion for receiving the ±1st order diffracted lights from the diffractive optical element and the protective-layer-thickness-deviation signal PES is obtained from the output of the light receiving portion for receiving the ±2nd order diffracted lights from the diffractive optical element.

In the first embodiment of the optical head device according to the present invention, the focus error signal FES used for the focus servo and the protective-layer-thickness-deviation signal PES are obtained based on the knife edge method. In the third embodiment of the optical head device according to the present invention, the focus error signal FES used for the focus servo and the protective-layer-thickness-deviation signal PES are obtained based on the spot size method. An embodiment of the optical head device according to the present invention can be considered that the focus error signal FES used for the focus servo and the protective-layer-thickness-deviation signal PES are obtained based on an astigmatism method. Specifically, a cylindrical lens for generating astigmatism and a diffractive optical element of which a region inside a circle mainly generate 0th order light and 1st order diffracted light and of which a region outside the circle mainly generate 0th order light. The optical axis of the incident light serves as the center of the circle. The photo detector receives the 0th order light and the 1st order diffractive light by different light receiving portions. The focus error signal FES used for the focus servo is obtained from the output of the light receiving portion for receiving the 0th order light. The protective-layer-thickness-deviation signal PES is obtained from the output of the light receiving portion for receiving the 1st order diffracted light. An embodiment of the optical head device according to the present invention can be considered that this optical diffractive element is replaced with an optical diffractive element of which a region outside a circle mainly generates 0th order light and 1st order diffracted light and of which a region inside the circle mainly generates 0th order light. The optical axis of the incident light serves as the center of the circle. Also, an embodiment of the optical head device according to the present invention can be considered that this optical diffractive element is replaced with an optical diffractive element of which a ring band region mainly generates 0th order light and 1st order diffracted light and of which the other region mainly generates 0th order light. The optical axis of the incident light serves as the center of the ring band region.

First Embodiment of Optical Information Recording/Reproducing Apparatus

Figure 21:
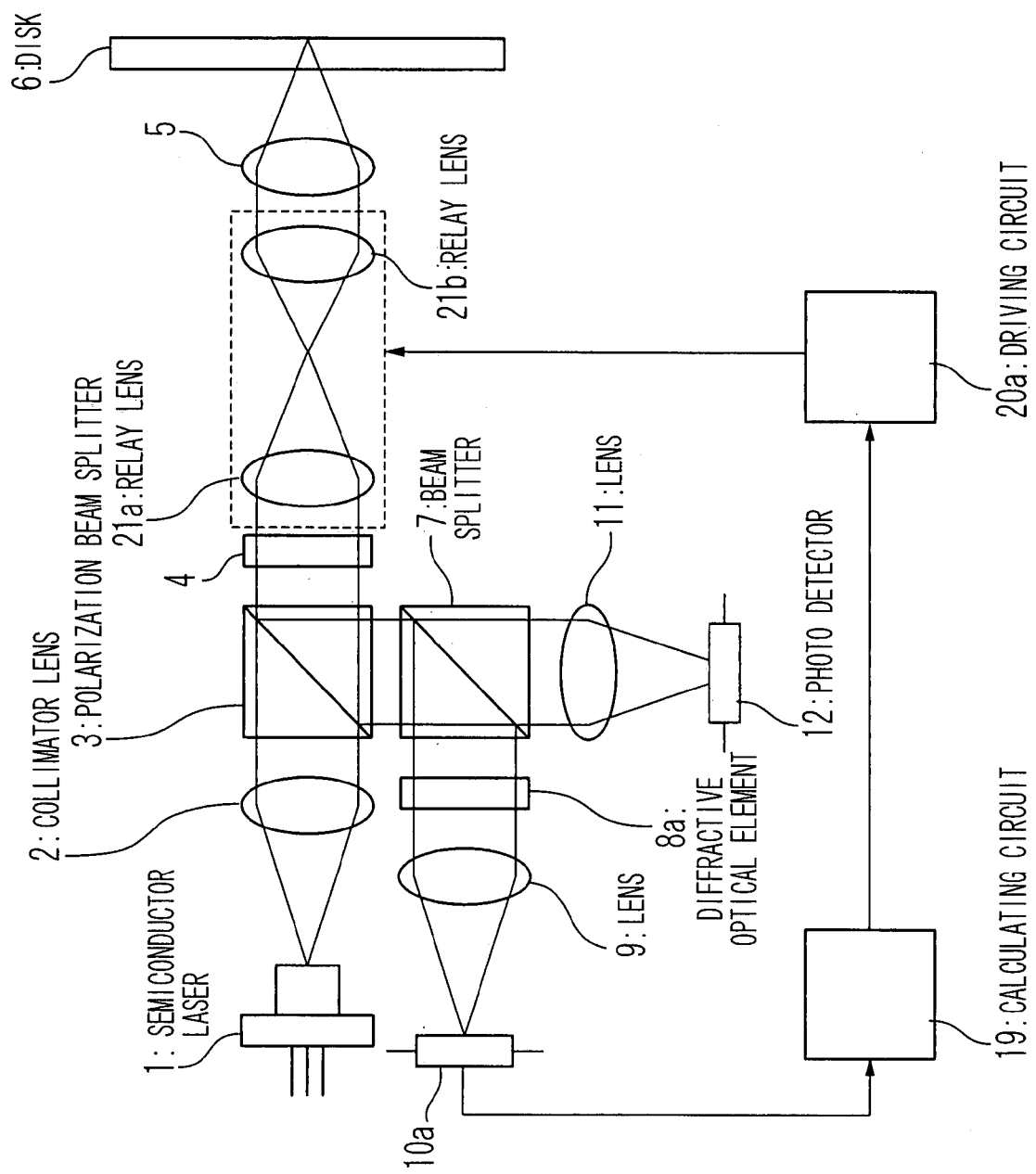
FIG. 21 is a configuration diagram in a first embodiment of an optical information recording/reproducing apparatus according to the present invention.

FIG. 21 is a configuration diagram in a first embodiment of an optical information recording/reproducing apparatus according to the present invention. The optical information recording/reproducing apparatus includes the optical head device 100 shown in FIG. 6, a calculating circuit 19, a driving circuit 20a and relay lenses 21a and 21b. The relay lenses 21a and 21b are installed between the ¼ wavelength plate 4 and the objective lens 5. The calculating circuit 19 is connected to the photo detector 10a and calculates the protective-layer-thickness-deviation signal PES based on outputs from light receiving portions of the photo detector 10a. The driving circuit 20a is connected to the calculating circuit 19 and an actuator (not shown) for driving the relay lenses 21a and 21b. The driving circuit 20a makes any one of the relay lenses 21a and 21b in a dotted box in the figure to move along the optical axis direction such that the protective-layer-thickness-deviation signal PES inputted from the calculating circuit 19 becomes 0. The movement of any one of the relay lenses 21a and 21b along the optical axis direction causes changes in magnification and spherical aberration of the objective lens 5. The position of any one of the relay lenses 21a and 21b along the optical axis is adjusted to generate the spherical aberration of the objective lens 5, which cancels the spherical aberration caused by the protective-layer-thickness deviation of the disk 6. Consequently, the protective-layer-thickness deviation of the disk 6 is compensated and a harmful effect on the record/reproduction characteristic disappears.

Figure 24:
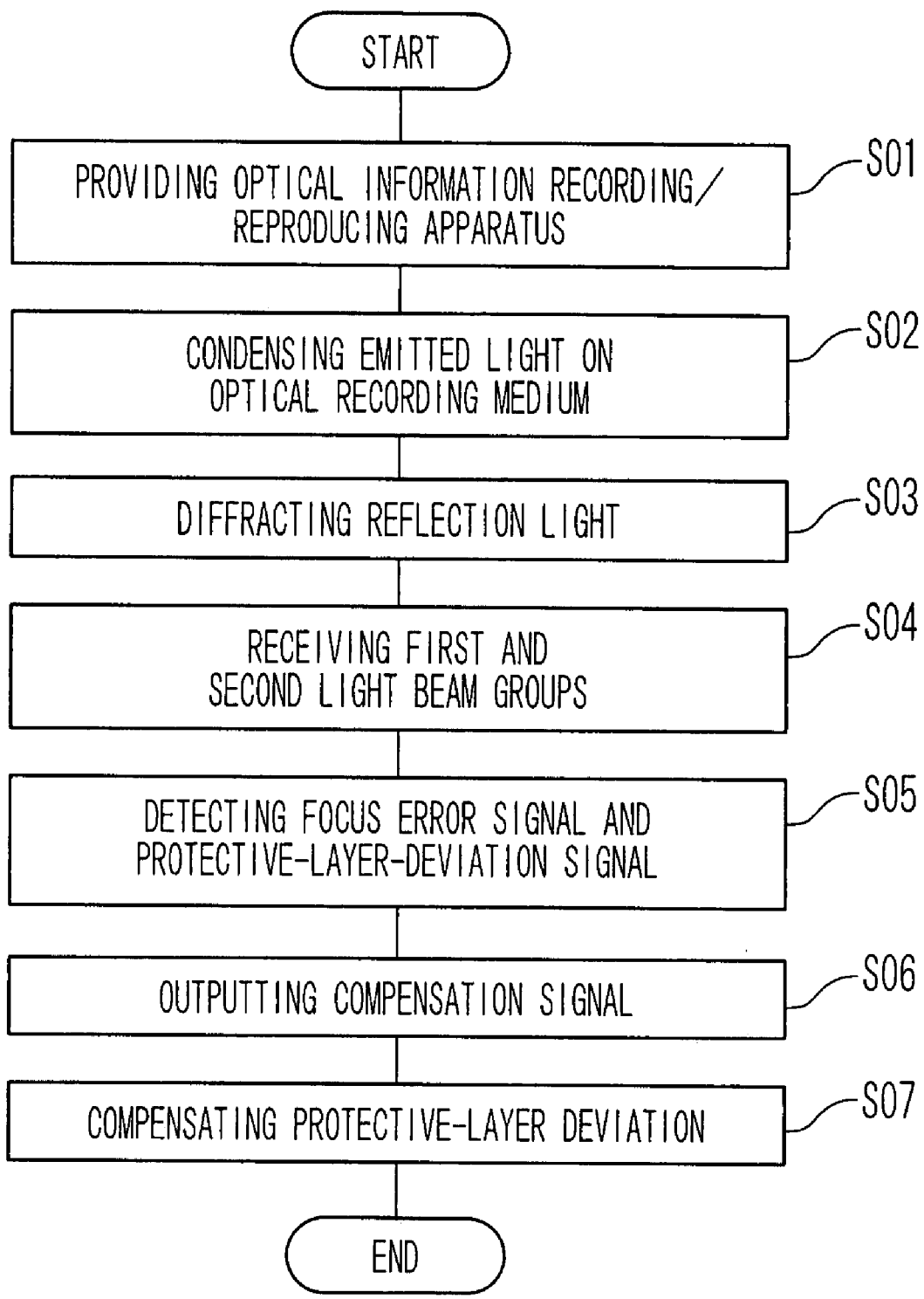
FIG. 24 is a flowchart showing an operation in the embodiments of the optical information recording/reproducing apparatus according to the present invention.

FIG. 24 is a flowchart showing an operation in the first embodiment of the optical information recording/reproducing apparatus according to the present invention (first embodiment of operation method of the optical information recording/reproducing apparatus).

At first, the optical information recording/reproducing apparatus of FIG. 21 is provided (Step S01). The semiconductor laser 1 emits the emitted light. The emitted light is made parallel by the collimator lens 2 and incidents as the P polarization light into the polarization beam splitter 3, and about 10.0% of the light is transmitted through the polarization beam splitter 3. The transmission light is converted from the straight polarization light into the circular polarization light through the ¼ wavelength plate 4 and then incidents through the relay lenses 21a and 21b into the objective lens 5. The objective lens 5 condenses the incident light onto the disk 6 (Step S02). The reflection light from the disk 6 is transmitted through the ¼ wavelength plate 4 in the opposite direction via the objective lens 5 and the relay lenses 21a and 21b and is converted from the circular polarization light into a straight polarization light of polarization direction orthogonal to that in the outward path, and incidents as the S polarization light into the polarization beam splitter 3. About 10.0% of the incident light is reflected by the polarization beam splitter 3, incidents into the beam splitter 7 and is separated into the reflection light and the transmission light. The reflection light from the beam splitter 7 is diffracted by the diffractive optical element 8a (Step S03). The different light receiving portions (14a to 14h) of the photo detector 10a receive a first light beam group (15a and 15b) and a second light beam group (15c and 15d), which are diffracted by the diffractive optical element 8a and transmitted through the lens 9 (Step S04). The first light beam group (15a and 15b) is the reflection light transmitted through the regions (13a and 13c, 13b and 13d) of the diffractive optical element 8a. The second light beam group (15c and 15d) is the reflection light transmitted through the partial regions (13a and 13b). On the other hand, the transmission light from the beam splitter 7 is transmitted through the lens 11 and received by the photo detector 12. The calculating circuit 19 detects the focus error signal FES used for the focus servo and the protective-layer-thickness-deviation signal PES, based on the output signals from the different light receiving portions (14a to 14h) (Step S05). The calculating circuit 19 outputs the focus error signal FES and the protective-layer-thickness-deviation signal PES to the driving circuit 20a. The driving circuit 20a outputs a compensation signal for compensating the protective-layer-thickness deviation of the optical recording medium to the actuator of the relay lenses 21a and 21b based on the protective-layer-thickness-deviation signal (Step S06). The compensation signal is a signal for moving any one of the relay lenses 21a and 21b along the optical axis direction such that the protective-layer-thickness-deviation signal PES inputted from the calculating circuit 19 becomes 0. Any one of the relay lenses 21a and 21b is moved along the optical axis direction to compensate the protective-layer-thickness deviation of the disk 6 (Step S07).

Figure 25:
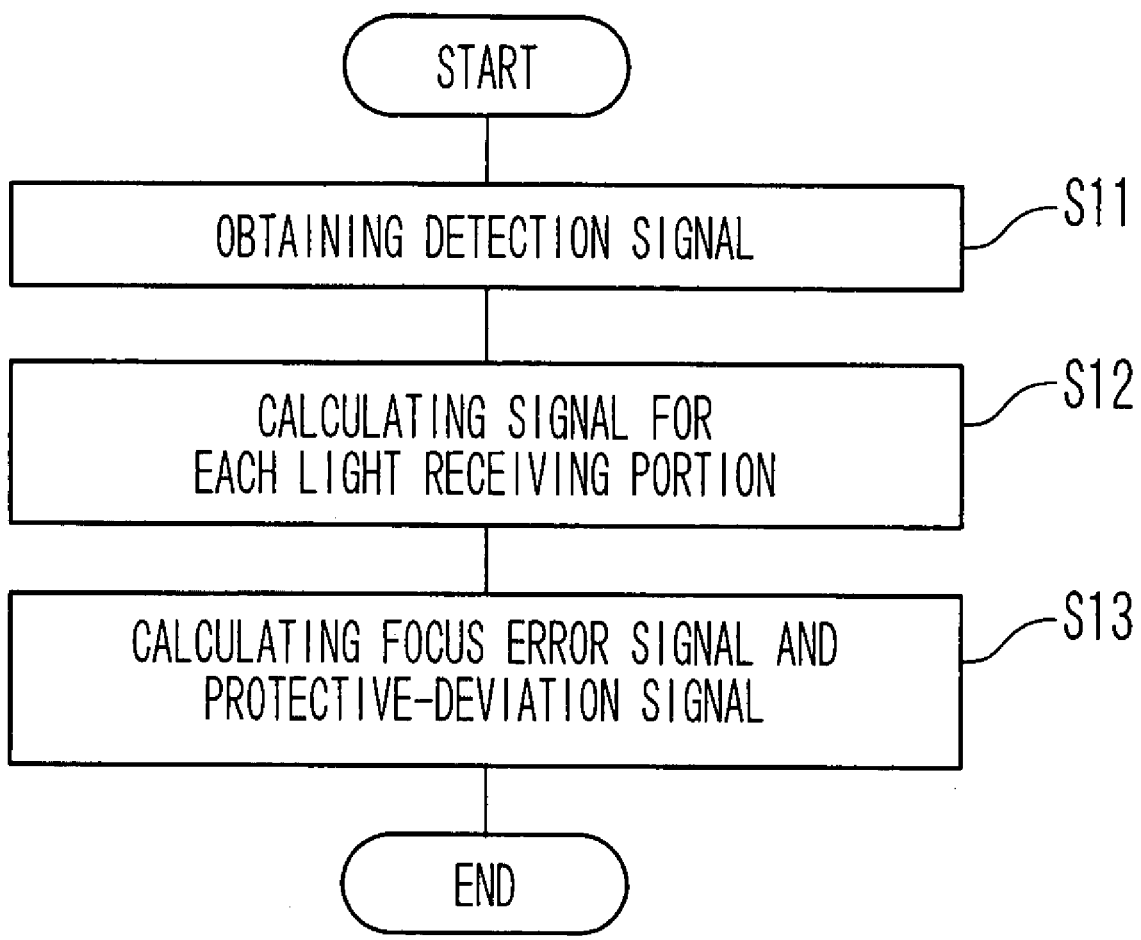
FIG. 25 is a flowchart showing detail of a step S05 in FIG. 24.

FIG. 25 is a flowchart showing the detail of the step S05 of FIG. 24.

The light receiving portions 14a to 14d output the detection signals (V14a to V14d) to the differential amplifier 16a of the calculating circuit 19, respectively, in response to the light reception. On the other hand, the light receiving portions 14e to 14h output the detection signals (V14e to V14h) to the differential amplifier 16b of the calculating circuit 19, respectively, in response to the light reception. The differential amplifier 16a obtains the detection signals (V14a to V14d). On the other hand, the differential amplifier 16b obtains the detection signals (V14e to V14h) (Step S11). The differential amplifier 16a calculates (V14a+V14d)−(V14b+V14c) to obtain a signal 17a. On the other hand, the differential amplifier 16b calculates (V14e+V14h)−(V14f+V14g) to obtain a signal 17b (Step S12). The calculating circuit 19 outputs the signal 17a (the focus error signal corresponding to the entire light beam based on the knife edge method) as the focus error signal FES used for the focus servo. Also, the calculating circuit 19 outputs the signal 17b (the focus error signal corresponding to the inner portion of the light beam based on the knife edge method) as the protective-layer-thickness-deviation signal PES indicating the protective-layer-thickness deviation of the disk 6 (Step S13).

As described above, the optical information recording/reproducing apparatus operates. By the way, here, an example in which the configuration in the first embodiment of the optical head device according to the present invention is employed is described. The present invention can be implemented similarly when the configurations in the second and third embodiments of the optical head devices are employed.

As for the optical head device and the optical information recording/reproducing apparatus according to the present invention, a configuration of the electric circuit for obtaining the focus error signal used for the focus servo and the protective-layer-thickness-deviation signal is simple, the degree of the deterioration in the record/reproduction characteristic is small even when the recording or reproducing is performed on the optical recording medium of multilayer type, the focus error signal indicating the accurate focus deviation can be used for the focus servo, and the protective-layer-thickness-deviation signal of high sensibility can be obtained.

Second Embodiment of Optical Information Recording/Reproducing Apparatus

Figure 22:
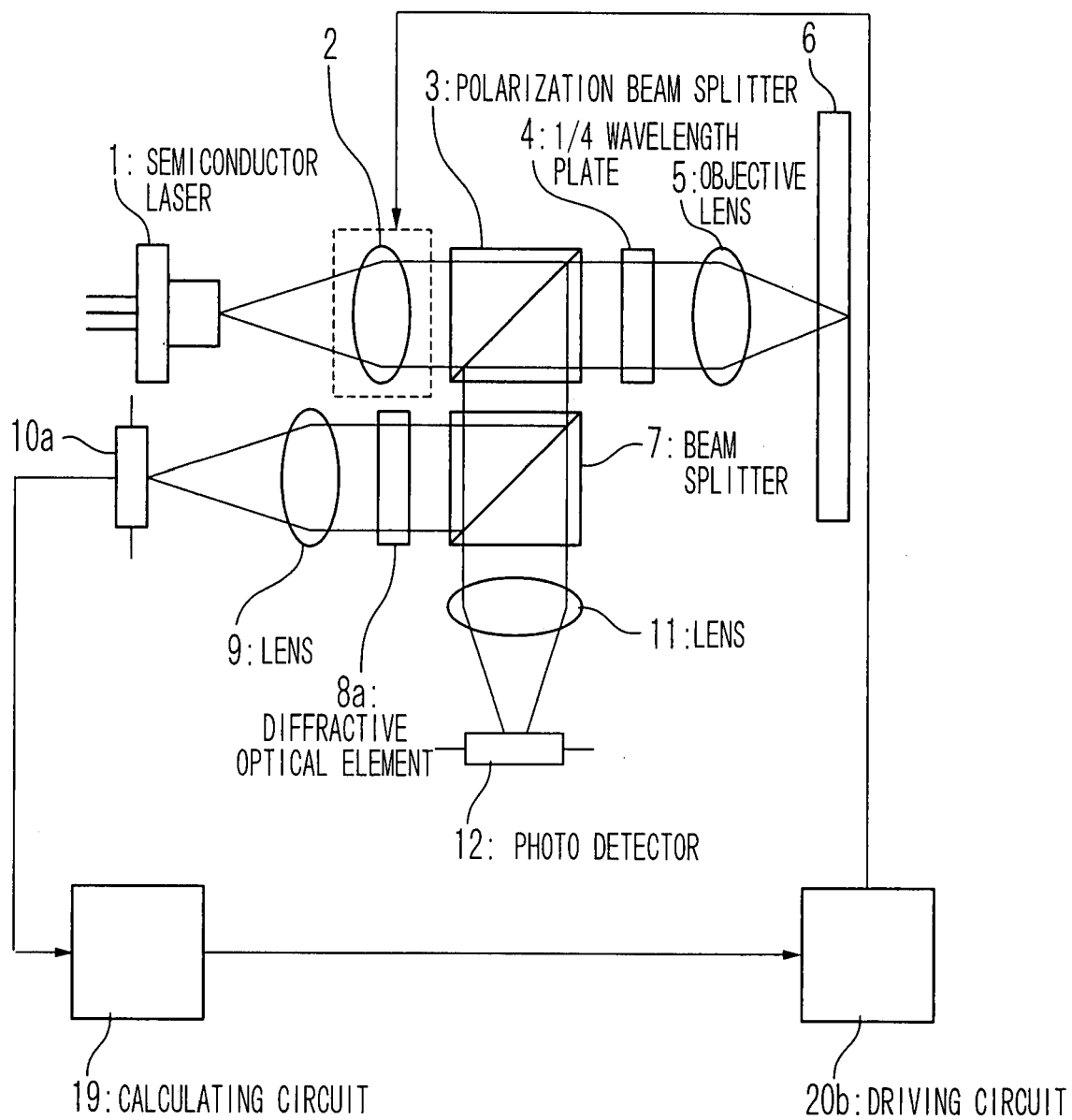
FIG. 22 is a configuration diagram in a second embodiment of the optical information recording/reproducing apparatus according to the present invention.

FIG. 22 is a configuration diagram in a second embodiment of the optical information recording/reproducing apparatus according to the present invention. The optical information recording/reproducing apparatus according to the present invention includes the optical head device 100 shown in FIG. 6, a calculating circuit 19, a driving circuit 20b. The calculating circuit 19 is connected to the photo detector 10a and calculates the protective-layer-thickness-deviation signal PES based on outputs from light receiving portions of the photo detector 10a. The driving circuit 20b is connected to the calculating circuit 19 and an actuator (not shown) for driving the collimator lens 2. The driving circuit 20b makes the collimator lens 2 in a dotted box in the figure to move along the optical axis direction such that the protective-layer-thickness-deviation signal PES inputted from the calculating circuit 19 becomes 0. The movement of the collimator lens 2 along the optical axis direction causes changes in magnification and spherical aberration of the objective lens 5. The position of the collimator lens 2 along the optical axis is adjusted to generate the spherical aberration of the objective lens 5, which cancels the spherical aberration caused by the protective-layer-thickness deviation of the disk 6. Consequently, the protective-layer-thickness deviation of the disk 6 is compensated and a harmful effect on the record/reproduction characteristic disappears.

FIG. 24 is a flowchart showing an operation in the second embodiment of the optical information recording/reproducing apparatus according to the present invention (second embodiment of operation method of the optical information recording/reproducing apparatus).

At first, the optical information recording/reproducing apparatus of FIG. 21 is provided (Step S01). The semiconductor laser 1 emits the emitted light. The emitted light is made parallel by the collimator lens 2 and incidents as the P polarization light into the polarization beam splitter 3, and about 10.0% of the light is transmitted through the polarization beam splitter 3. The transmission light is converted from the straight polarization light into the circular polarization light through the ¼ wavelength plate 4 and then incidents into the objective lens 5. The objective lens 5 condenses the incident light onto the disk (Step S02). The reflection light from the disk 6 is transmitted through the ¼ wavelength plate 4 in the opposite direction via the objective lens 5 and is converted from the circular polarization light into a straight polarization light of polarization direction orthogonal to that in the outward path, and incidents as the S polarization light into the polarization beam splitter 3. About 10.0% of the incident light is reflected by the polarization beam splitter 3, incidents into the beam splitter 7 and is separated into the reflection light and the transmission light. The reflection light from the beam splitter 7 is diffracted by the diffractive optical element 8a (Step S03). The different light receiving portions (14a to 14h) of the photo detector 10a receive a first light beam group (15e and 15f) and a second light beam group (15g and 15h), which are diffracted by the diffractive optical element 8a and transmitted through the lens 9 (Step S04). The first light beam group (15e and 15f) is the reflection light transmitted through the regions (13a and 13e, 13b and 13f) of the diffractive optical element 8a. The second light beam group (15g and 15h) is the reflection light transmitted through the partial regions (13a and 13f, 13b and 13e). On the other hand, the transmission light from the beam splitter 7 is transmitted through the lens 11 and received by the photo detector 12. The calculating circuit 19 detects the focus error signal FES used for the focus servo and the protective-layer-thickness-deviation signal PES, based on the output signals from the different light receiving portions (14a to 14h) (Step S05). The calculating circuit 19 outputs the focus error signal FES and the protective-layer-thickness-deviation signal PES to the driving circuit 20b. The driving circuit 20b outputs a compensation signal for compensating the protective-layer-thickness deviation of the optical recording medium to the actuator of the collimator lens 2 based on the protective-layer-thickness-deviation signal (Step S06). The compensation signal is a signal for moving the collimator lens 2 along the optical axis direction such that the protective-layer-thickness-deviation signal PES inputted from the calculating circuit 19 becomes 0. The collimator lens 2 is moved along the optical axis direction to compensate the protective-layer-thickness deviation of the disk 6 (Step S07).

FIG. 25 is a flowchart showing the detail of the step S05 of FIG. 24.

The light receiving portions 14e to 14h output the detection signals (V14e to V14h) to the differential amplifier 16a of the calculating circuit 19, respectively, in response to the light reception. On the other hand, the light receiving portions 14a to 14d output the detection signals (V14a to V14d) to the differential amplifier 16b of the calculating circuit 19, respectively, in response to the light reception. The differential amplifier 16a obtains the detection signals (V14e to V14h). On the other hand, the differential amplifier 16b obtains the detection signals (V14a to V14d) (Step S11). The differential amplifier 16a calculates (V14e+V14h)−(V14f+V14g) to obtain a signal 17c. On the other hand, the differential amplifier 16b calculates (V14a+V14d)−(V14b+V14c) to obtain a signal 17d (Step S12). The calculating circuit 19 outputs the signal 17c (the focus error signal corresponding to the entire light beam based on the knife edge method) as the focus error signal FES used for the focus servo. Also, the calculating circuit 19 outputs the signal 17d (the difference between the focus error signal 18a corresponding to the inner portion of the light beam based on the knife edge method and the focus error signal 18b corresponding to the outer portion of the light beam based on the knife edge method) as the protective-layer-thickness-deviation signal PES indicating the protective-layer-thickness deviation of the disk 6 (Step S13).

As described above, the optical information recording/reproducing apparatus operates. By the way, here, an example in which the configuration of the second embodiment of the optical head device according to the present invention is employed is described. The present invention can be implemented similarly when the configurations of the first and third embodiments of the optical head device are employed.

As for the optical head device and the optical information recording/reproducing apparatus according to the present invention, a configuration of the electric circuit for obtaining the focus error signal used for the focus servo and the protective-layer-thickness-deviation signal is simple, the degree of the deterioration in the record/reproduction characteristic is small even when the recording or reproducing is performed on the optical recording medium of multilayer type, the focus error signal indicating the accurate focus deviation can be used for the focus servo, and the protective-layer-thickness-deviation signal of high sensibility can be obtained.

Third Embodiment of Optical Information Recording/Reproducing Apparatus

Figure 23:
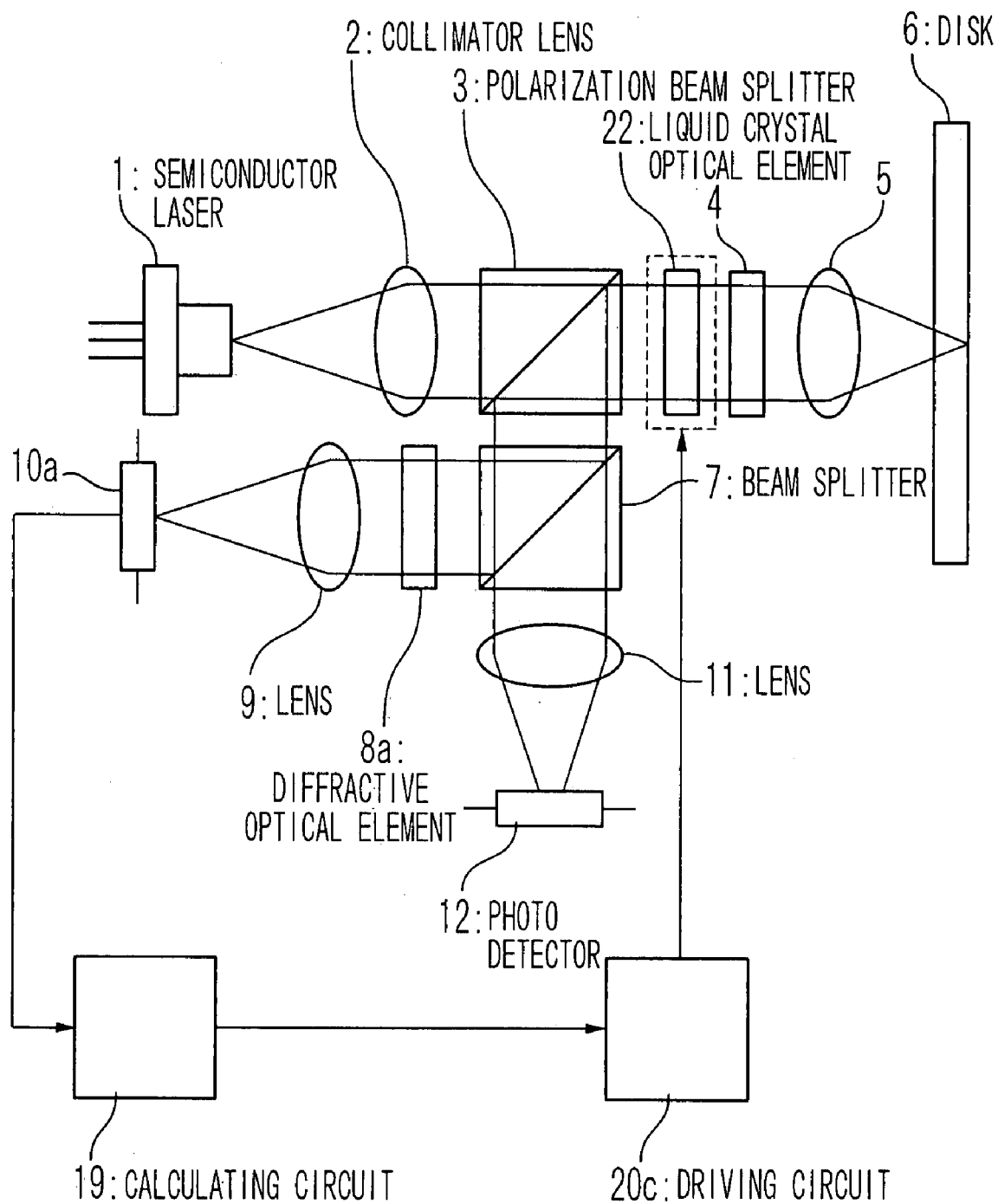
FIG. 23 is a configuration diagram in a third embodiment of the optical information recording/reproducing apparatus according to the present invention.

FIG. 23 is a configuration diagram in the third embodiment of the optical information recording/reproducing apparatus according to the present invention. The optical information recording/reproducing apparatus according to the present invention includes the optical head device 100 shown in FIG. 6, a calculating circuit 19, a driving circuit 20c and a liquid crystal optical element 22. The liquid crystal optical element 22 is installed between the polarization beam splitter 3 and the ¼ wavelength plate 4. The calculating circuit 19 is connected to the photo detector 10a and calculates the protective-layer-thickness-deviation signal PES based on outputs from light receiving portions of the photo detector 10a. The driving circuit 20c is connected to the calculating circuit 19 and (a voltage controller section of) the liquid crystal optical element 22. The driving circuit 20c applies voltages to the liquid crystal optical element 22 in a dotted box in the figure such that the protective-layer-thickness-deviation signal PES inputted from the calculating circuit 19 becomes 0. The liquid crystal optical element 22 is separated in a plurality of regions, a change in the voltage applied to each region causes a change in spherical aberration to the transmitting light. The voltages applied to the liquid crystal optical element 22 are adjusted to generate the spherical aberration of liquid crystal optical element 22, which cancels the spherical aberration caused by the protective-layer-thickness deviation of the disk 6. Consequently, the protective-layer-thickness deviation of the disk 6 is compensated and a harmful effect on the record/reproduction characteristic disappears.

FIG. 24 is a flowchart showing an operation in the third embodiment of the optical information recording/reproducing apparatus according to the present invention (third embodiment of operation method of the optical information recording/reproducing apparatus).

At first, the optical information recording/reproducing apparatus of FIG. 21 is provided (Step S01). The semiconductor laser 1 emits the emitted light. The emitted light is made parallel by the collimator lens 2 and incidents as the P polarization light into the polarization beam splitter 3, and about 10.0% of the light is transmitted through the polarization beam splitter 3. The transmission light, after the transmission through the liquid crystal optical element 22, is converted from the straight polarization light into the circular polarization light through the ¼ wavelength plate 4 and then incidents into the objective lens 5. The objective lens 5 condenses the incident light onto the disk (Step S02). The reflection light from the disk 6 is transmitted through the ¼ wavelength plate 4 in the opposite direction via the objective lens 5 and is converted from the circular polarization light into a straight polarization light of polarization direction orthogonal to that in the outward path, and incidents as the S polarization light into the polarization beam splitter 3 after the transmission through the liquid crystal optical element 22. About 10.0% of the incident light is reflected by the polarization beam splitter 3, incidents into the beam splitter 7 and is separated into the reflection light and the transmission light. The reflection light from the beam splitter 7 is diffracted by the diffractive optical element 8a (Step S03). The different light receiving portions (14a to 14h) of the photo detector 10a receive a first light beam group (15i and 15j) and a second light beam group (15k and 15l), which are diffracted by the diffractive optical element 8a and transmitted through the lens 9 (Step S04). The first light beam group (15i and 15j) is the reflection light transmitted through the regions (13g and 13h) of the diffractive optical element 8a. The second light beam group (15g and 15h) is the reflection light transmitted through the partial regions (13g). On the other hand, the transmission light from the beam splitter 7 is transmitted through the lens 11 and received by the photo detector 12. The calculating circuit 19 detects the focus error signal FES used for the focus servo and the protective-layer-thickness-deviation signal PES, based on the output signals from the different light receiving portions (14a to 14h) (Step S05). The calculating circuit 19 outputs the focus error signal FES and the protective-layer-thickness-deviation signal PES to the driving circuit 20c. The driving circuit 20c outputs a compensation signal for compensating the protective-layer-thickness deviation of the optical recording medium to the voltage controller section of the liquid crystal optical element 22 based on the protective-layer-thickness-deviation signal (Step S06). The compensation signal is a signal for changing the voltages applied to the liquid crystal optical element 22 such that the protective-layer-thickness-deviation signal PES inputted from the calculating circuit 19 becomes 0. The liquid crystal optical element 22 changes the spherical aberration to the transmitting light based on the applied voltages to compensate the protective-layer-thickness deviation of the disk 6 (Step S07).

FIG. 25 is a flowchart showing the detail of the step S05 of FIG. 24.

The light receiving portions 14i to 14n output the detection signals (V14i to V14n) to the differential amplifier 16a of the calculating circuit 19, respectively, in response to the light reception. On the other hand, the light receiving portions 14o to 14t output the detection signals (V14o to V14t) to the differential amplifier 16b of the calculating circuit 19, respectively, in response to the light reception. The differential amplifier 16a obtains the detection signals (V14i to V14n). On the other hand, the differential amplifier 16b obtains the detection signals (V14o to V14t) (Step S11). The differential amplifier 16a calculates (V14i+V14k+V14m)−(V14j+V14l+V14n) to obtain a signal 17e. On the other hand, the differential amplifier 16b calculates (V14o+V14q+V14s)−(V14p+V14r+V14t) to obtain a signal 17f (Step S12). The calculating circuit 19 outputs the signal 17e (the focus error signal corresponding to the entire light beam based on the spot size method) as the focus error signal FES used for the focus servo. Also, the calculating circuit 19 outputs the signal 17*f* (the focus error signal corresponding to the inner portion of the light beam based on the spot size method) as the protective-layer-thickness-deviation signal PES indicating the protective-layer-thickness deviation of the disk 6 (Step S13).

As described above, the optical information recording/reproducing apparatus operates. By the way, here, an example in which the configuration in the third embodiment of the optical head device according to the present invention is employed is described. The present invention can be implemented similarly when the configurations in the first and second embodiments of the optical head device are employed.

As for the optical head device and the optical information recording/reproducing apparatus according to the present invention, a configuration of the electric circuit for obtaining the focus error signal used for the focus servo and the protective-layer-thickness-deviation signal is simple, the degree of the deterioration in the record/reproduction characteristic is small even when the recording or reproducing is performed on the optical recording medium of multilayer type, the focus error signal indicating the accurate focus deviation can be used for the focus servo, and the protective-layer-thickness-deviation signal of high sensibility can be obtained.

An embodiment of the optical information recording/reproducing apparatus according to the present invention can be considered to includes the calculating circuit, the driving circuit and the like in addition to the second or third embodiment of the optical head device according to the present invention.

The embodiments of the present invention have been described in detail above. The specific configuration of the present invention is not limited to the above embodiments and can be modified without departing from the scope of the present invention.

According to the optical head device and the optical information recording/reproducing apparatus of the present invention, the protective-layer deviation of the optical recording medium can be detected at high sensibility. Also, at least one of the focus deviation and the protective-layer-thickness deviation can be detected by using a circuit of simple configuration. Moreover, the deterioration in the record/reproduction characteristic can be reduced for the optical recording medium of multilayer type. Moreover, the configurations of the optical head device and the optical information recording/reproducing apparatus can be simplified.

The invention claimed is:

1. An optical head device comprising:
   an objective lens configured to condense an emitted light from a light source onto an optical recording medium;
   a diffractive optical element configured to separate a incident light into a plurality of light beams, wherein said emitted light is reflected by said optical recording medium and incidents as said incident light through said objective lens into said diffractive optical element; and
   a photo detector,
   wherein said plurality of light beams includes a first light beam group which is generated from an entire region in a section of said incident light and a second light beam group which is generated from at least a partial region in said section, and
   said photo detector is configured to receive said first light beam group and said second light beam group by different light receiving portions for detecting a focus error signal used for focus servo and a protective-layer-thickness-deviation signal indicating a protective-layer-thickness deviation of said optical recording medium.

2. The optical head device according to claim 1, wherein a section of said diffractive optical element includes a first region and a second region,
   said section of said diffractive optical element is perpendicular to an optical axis of said incident light,
   a distance between said first region and said optical axis is within a first range,
   a distance between said second region and said optical axis is within a second range,
   said first light beam group is generated from a first portion and a second portion of said incident light,
   said first portion incidents into said first region,
   said second portion incidents into said second region, and
   said second light beam group is generated from said first portion.

3. The optical head device according to claim 2, wherein said first region is a region inside a circle in said section of said diffractive optical element, said optical axis serves as a center of said circle, and
   said second region is a region outside said circle in said section of said diffractive optical element.

4. The optical head device according to claim 2, wherein said first region is a ring band region in said section of said diffractive optical element,
   said optical axis serves as a center of said ring band region, and
   said second region is a region other than said first region in said section of said diffractive optical element.

5. The optical head device according to claim 2, wherein said first region includes a first upper region and a first lower region which are separated by a straight line on said section of said diffractive optical element,
   said straight line extends through said optical axis,
   said second region includes a second upper region and a second lower region separated by said straight line,
   said first portion includes a first upper portion which incidents into said first upper region and a first lower portion which incidents into said first lower portion,
   said second portion includes a second upper portion which incidents into said second upper region and a second lower portion which incidents into said second lower region,
   said first light beam group includes:
   a light beam generated from said first upper portion and said second upper portion; and
   a light beam generated from said first lower portion and said second lower portion, and
   said second light beam group includes:
   a light beam generated from said first upper portion; and
   a light beam generated from said first lower portion.

6. The optical head device according to claim 1, wherein a section of said diffractive optical element includes a first region and a second region,
   said section of said diffractive optical element is perpendicular to an optical axis of said incident light,
   a distance between said first region and said optical axis is within a first range,
   a distance between said second region and said optical axis is within a second range,
   said first region includes a first upper region and a first lower region which are separated by a straight line on said section of said diffractive optical element,
   said straight line extends through said optical axis,
   said second region includes a second upper region and a second lower region separated by said straight line, said first portion includes a first upper portion which incidents into said first upper region and a first lower portion which incidents into said first lower portion, said second portion includes a second upper portion which incidents into said second upper region and a second lower portion which incidents into said second lower region, said first light beam group includes:

a light beam generated from said first upper portion and said second upper portion; and a light beam generated from said first lower portion and said second lower portion, and said second light beam group includes:

a light beam generated from said first upper portion and said second lower portion; and a light beam generated from said first lower portion and said second upper portion.

7. The optical head device according to claim 5, wherein said first light beam group is a −2nd order diffracted light from said first upper region, a +2nd order diffracted light from said first lower region, a −2nd order diffracted light from said second upper region and a +2nd order diffracted light from said second lower region, and said second light beam group is a −1st order diffracted light from said first upper region and a +1st order diffracted light from said first lower region.

8. The optical head device according to claim 2, wherein said first light beam group is ±1st order diffracted lights from said first region and ±1st order diffracted lights from said second region, and said second light beam group is ±2nd order diffracted lights from said first region.

9. The optical head device according to claim 2, wherein said first light beam group is a 0th order light from said first region and a 0th order light from said second region, and said second light beam group is a 1st order diffracted light from said first region.

10. The optical head device according to claim 6, wherein said first light beam group is a −1st order diffracted light from said first upper region, a +1st order diffracted light from said first lower region, a −1st order diffracted light from said second upper region and a +1st order diffracted light from said second lower region, and said second light beam group is a −2nd order diffracted light from said first upper region, a +2nd order diffracted light from said first lower region, a +2nd order diffracted light from said second upper region and a −2nd order diffracted light from said second lower region.

11. An optical information recording/reproducing apparatus comprising:

an optical head device; and a calculating circuit, wherein said optical head device comprises:

an objective lens configured to condense an emitted light from a light source onto an optical recording medium;

a diffractive optical element configured to separate a incident light into a plurality of light beams; and a photo detector, said emitted light is reflected by said optical recording medium and incidents as said incident light through said objective lens into said diffractive optical element, said plurality of light beams includes a first light beam group which is generated from an entire region in a section of said incident light and a second light beam group which is generated from at least a partial region in said section, said photo detector is configured to receive said first light beam group and said second light beam group by different light receiving portions for detecting a focus error signal used for focus servo and a protective-layer-thickness-deviation signal indicating a protective-layer-thickness deviation of said optical recording medium, and said calculating circuit is configured to detect said focus error signal and said protective-layer-thickness-deviation signal based on output signals from said different light receiving portions.

12. The optical information recording/reproducing apparatus according to claim 11, wherein said calculating circuit includes a first differential amplifying circuit, said different light receiving portions includes a first light receiving portion configured to receive said first light beam group and to output a first output signal corresponding to said first light beam group, and said first differential amplifying circuit is configured to generate said focus error signal based on said first output signal.

13. The optical information recording/reproducing apparatus according to claim 12, wherein said calculating circuit further includes a second differential amplifying circuit, said different light receiving portions further includes a second light receiving portion configured to receive said second light beam group and to output a second output signal corresponding to said second light beam group, said second differential amplifying circuit is configured to generate a third output signal based on said second output signal, and said calculating circuit is configured to detect said third output signal as said protective-layer-thickness-deviation signal.

14. The optical information recording/reproducing apparatus according to claim 12, wherein said calculating circuit further includes a second differential amplifying circuit, said different light receiving portions further includes a second light receiving portion configured to receive said second light beam group and to output a second output signal corresponding to said second light beam group, said second differential amplifying circuit is configured to generate a third output signal based on said second output signal, and said calculating circuit is configured to detect a signal obtained by subtracting said focus error signal from said third output signal as said protective-layer-thickness-deviation signal.

15. The optical information recording/reproducing apparatus according to claim 11, further comprising:

a driving circuit configured to output a drive signal based on said protective-layer-thickness-deviation signal; and a compensating section configured to compensate said protective-layer-thickness deviation based on said drive signal.

16. The optical information recording/reproducing apparatus according to claim 15, wherein said compensating section is two relay lenses installed between said light source and said objective lens, and said driving circuit is configured to make one of said two relay lenses to move along an optical axis of said one of said two relay lenses through said drive signal to compensate said protective-layer-thickness deviation.

17. The optical information recording/reproducing apparatus according to claim 15, wherein said compensating section is a collimator lens installed between said light source and said objective lens, and said driving circuit is configured to make said collimator lens to move along an optical axis of said collimator lens through said drive signal to compensate said protective-layer-thickness deviation.

18. The optical information recording/reproducing apparatus according to claim 15, wherein said compensating section is a liquid crystal optical element installed between said light source and said objective lens, and said driving circuit is configured to apply a voltage to said liquid crystal optical element through said drive signal to compensate said protective-layer-thickness deviation.

19. An operating method of optical information recording/reproducing apparatus, comprising:

providing an optical information recording/reproducing apparatus which includes an optical head device, a calculating circuit, a compensating section and a driving circuit, wherein said optical head device includes a light source, an objective lens, a diffractive optical element and a photo detector;

said objective lens condensing an emitted light from said light source onto an optical recording medium;

said diffractive optical element separating a incident light into a plurality of light beams, wherein said emitted light is reflected by said optical recording medium and incidents as said incident light through said objective lens into said diffractive optical element, and said plurality of light beams includes a first light beam group generated from an entire region in a section of said incident light and a second light beam group generated from at least a partial region in said section;

different light receiving portions of said photo detector receiving said first light beam group and said second light beam group;

said calculating circuit detecting a focus error signal used for a focus servo and a protective-layer-thickness-deviation signal based on output signals from said different light receiving portions;

said driving circuit outputting a drive signal based on said protective-layer-thickness-deviation signal; and said compensating section compensating a protective-layer-thickness deviation of said optical recording medium based on said drive signal.

20. The operating method of optical information recording/reproducing apparatus according to claim 19, wherein said compensating section is two relay lenses installed between said light source and said objective lens, and in said compensating, said driving circuit makes one of said two relay lenses to move along an optical axis of said one of said relay lenses through said drive signal to compensate said protective-layer-thickness deviation.

21. The operating method of optical information recording/reproducing apparatus according to claim 19, wherein said compensating section is a collimator lens installed between said light source and said objective lens, and in said compensating, said driving circuit makes said collimator lens to move along an optical axis of said collimator lens through said drive signal to compensate said protective-layer-thickness deviation.

22. The operating method of optical information recording/reproducing apparatus according to claim 19, wherein said compensating section is a liquid crystal optical element installed between said light source and said objective lens, and in said compensating, said driving circuit applies a voltage to said liquid crystal optical element through said drive signal to compensate said protective-layer-thickness deviation.

* * * * *